United States Patent
Taranov

(10) Patent No.: US 12,164,486 B2
(45) Date of Patent: Dec. 10, 2024

(54) SCHEMA AGNOSTIC MIGRATION OF DELINEATED DATA BETWEEN RELATIONAL DATABASES

(71) Applicant: Microsoft Technology Licensing, LLC, Redmond, WA (US)

(72) Inventor: Igor Taranov, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 62 days.

(21) Appl. No.: 17/583,023

(22) Filed: Jan. 24, 2022

(65) Prior Publication Data
US 2022/0147499 A1 May 12, 2022

Related U.S. Application Data

(62) Division of application No. 16/914,060, filed on Jun. 26, 2020, now Pat. No. 11,232,084.

(51) Int. Cl.
G06F 16/21 (2019.01)
G06F 16/22 (2019.01)

(52) U.S. Cl.
CPC .......... G06F 16/214 (2019.01); G06F 16/211 (2019.01); G06F 16/2246 (2019.01); G06F 16/2282 (2019.01)

(58) Field of Classification Search
CPC .............. G06F 16/214; G06F 16/2246; G06F 16/2282; G06F 16/211
USPC ......................................................... 707/803
See application file for complete search history.

(56) References Cited

U.S. PATENT DOCUMENTS

| 6,151,608 | A  | * | 11/2000 | Abrams | G06F 16/214 |
| | | | | | 707/999.1 |
| 6,460,043 | B1 | * | 10/2002 | Tabbara | G06F 16/2423 |
| 7,496,596 | B2 | * | 2/2009 | Li | G06F 16/213 |
| | | | | | 707/999.102 |
| 7,620,665 | B1 | * | 11/2009 | George | G06F 16/214 |
| 10,909,120 | B1 | * | 2/2021 | Mohamad | G06F 16/24554 |
| 2003/0221162 | A1 | * | 11/2003 | Sridhar | G06F 16/972 |
| | | | | | 715/229 |

(Continued)

OTHER PUBLICATIONS

Oracle® (Revenue Management and Billing Version 2.6.0.1.0) Configuration Migration Assistant User Guide Revision 1.0 E93755-01, Mar. 2018 (hereafter "OraMigAUG") (Year: 2018).*

*Primary Examiner* — Kuen S Lu
(74) *Attorney, Agent, or Firm* — Weaver IP L.L.C.

(57) ABSTRACT

Initially, a database schema is parsed and a table tree structure is created delineating the relationships between data that are identified in the schema. In addition to accomodating relationships between main tables of data, the table tree structure also accomodates possible side tables of data, and possible circular references between tables, should such be encountered when parsing the schema. Subsequently, a migration mechanism consumes the generated table tree structure and iteratively migrates data in accordance therewith. Individual layers of the table tree structure are migrated consecutively with referenced layers being migrated prior to referencing layers. Circular links are accommodated through temporary null values, and side tables are accommodated during migration of the referencing main table. The iterative process provides completeness and fault tolerance/failure recovery.

20 Claims, 12 Drawing Sheets

(56) References Cited

U.S. PATENT DOCUMENTS

| | | | |
|---|---|---|---|
| 2009/0193006 A1* | 7/2009 | Herrnstadt | G06F 16/221 |
| | | | 707/999.005 |
| 2009/0222691 A1* | 9/2009 | Riemers | G06F 16/214 |
| | | | 714/18 |
| 2010/0057759 A1* | 3/2010 | Cotichini | G06F 16/972 |
| | | | 707/E17.009 |
| 2010/0161552 A1* | 6/2010 | Murarasu | G06F 16/283 |
| | | | 707/610 |
| 2015/0019488 A1* | 1/2015 | Higginson | G06F 16/214 |
| | | | 707/634 |

* cited by examiner

SCHEMA AGNOSTIC MIGRATION OF DELINEATED DATA BETWEEN RELATIONAL DATABASES

CROSS-REFERENCE TO RELATED APPLICATION

This application is a divisional of, and claims priority to, U.S. patent application Ser. No. 16/914,060, issued as U.S. Pat. No. 11,232,084, filed on Jun. 26, 2020, and entitled "SCHEMA AGNOSTIC MIGRATION OF DELINEATED DATA BETWEEN RELATIONAL DATABASES", the specification of which is hereby incorporated by reference in its entirety for all that it teaches and suggests.

BACKGROUND

Relational databases are a ubiquitous construct by which computing devices store and retrieve data. In a relational database, an entry of data can reference, or "relate to", another entry of data through the use of keys, or pointers. For example, individual data entries can comprise information about individual customers, such as the customers' first and last names, mailing addresses, birth dates, and other like information. The storage of such information in a relational database can be visualized in the form of a table, with table columns corresponding to individual categories of information, such as first names, last names, and so on, and table rows corresponding to individual data entries. In the above example, a single data entry, containing information about a single customer, can be assigned an identifier, such as a customer identifier, which can also be visualized in the form of a column of information in the aforementioned table. Other data entries can reference the above-referenced customer data entries merely by utilizing the customer identifier. Thus, for example, a data entry corresponding to a specific order can identify the customer placing the order simply by including the customer identifier. In such a manner, the constructs of the relational database enable the establishment of relationships between customers and orders, for example, such that various data analyzing operations, such as determining which orders were placed by a specific customer, can be easily and efficiently performed.

The individual data fields, the relationships between data fields, the structures within which the data is stored, and other like aspects of relational databases are typically defined in one or more schemas that delineate the manner in which the relational database stores data and relates the stored data to one another. In some instances, it may be necessary to migrate a delineated grouping of data from one relational database to another. For example, a source relational database may need to transfer some data to a destination relational database in order to alleviate a computing or storage burden associated with the source relational database. As another example, a particular customer of a relational database service provider may seek to move some or all of their data to a different relational database.

Mechanisms for migrating a delineated grouping of data from a source relational database to a destination relational database are typically specific to the schemas utilized by the relational databases. Moreover, such migration mechanisms are complex and, are therefore, difficult to troubleshoot and/or verify the correctness of their operation.

SUMMARY

To address the problems of complexity and schema-specific relational database migration mechanisms, a schema agnostic mechanism for migrating delineated data between relational databases is presented. Initially, the database schema is parsed and a table tree structure is created delineating the relationships between data that are identified in the schema. In addition to accommodating relationships between main tables of data, the table tree structure also accommodates possible side tables of data and possible circular references between tables, should such be encountered when parsing the schema. Subsequently, a migration mechanism consumes the generated table tree structure and iteratively migrates data in accordance therewith. Individual layers of the table tree structure are migrated consecutively with referenced layers being migrated prior to referencing layers. Circular links are accommodated through temporary null values, and side tables are accommodated during migration of the referencing main table. The iterative process provides completeness and fault tolerance/failure recovery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1A:
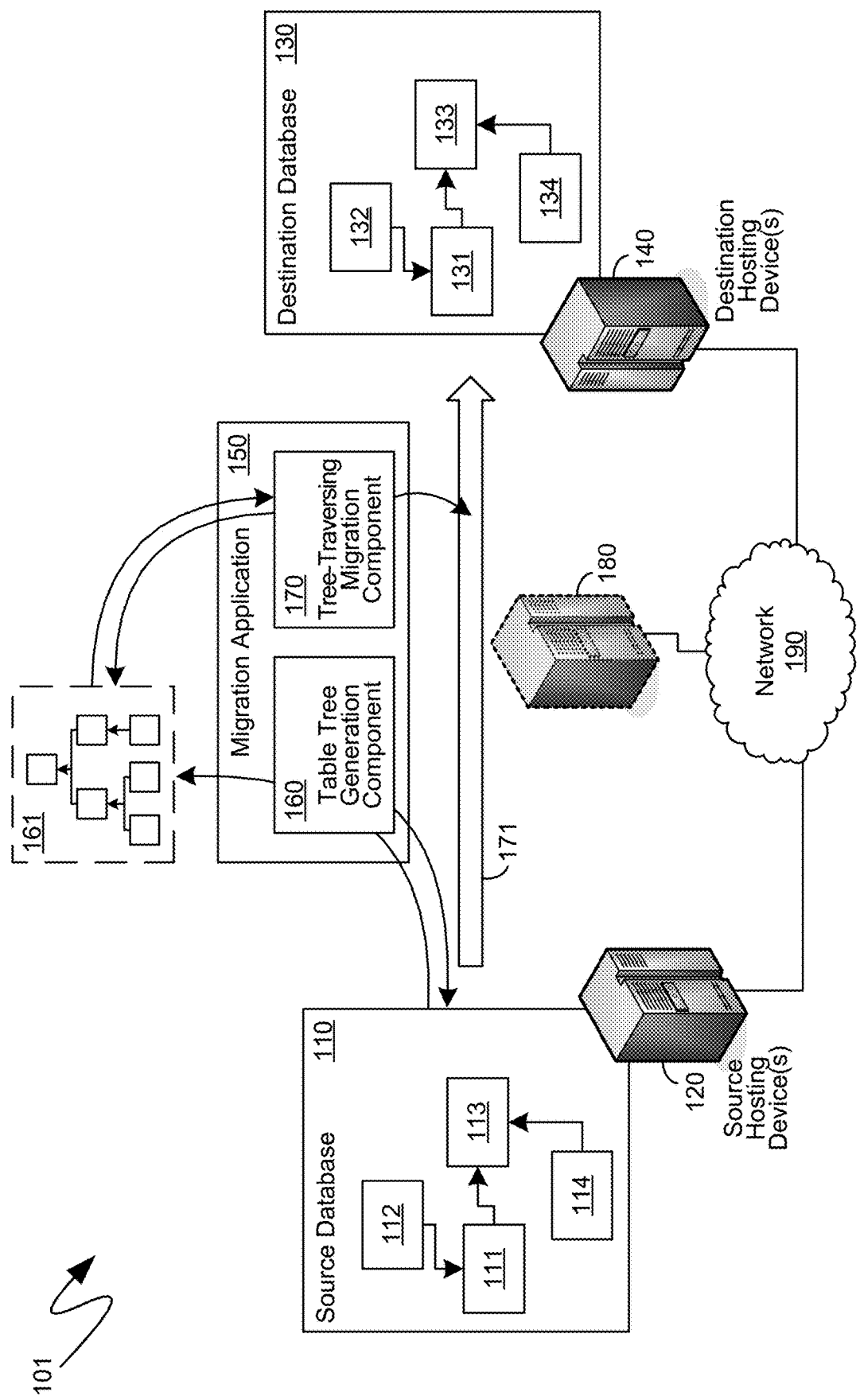
FIGS. 1a-1b are system diagrams of an exemplary system within which data may be migrated between relational databases.

The following description relates to addressing the problems of complexity and schema-specific relational database migration mechanisms, a schema agnostic mechanism for migrating delineated data between relational databases is presented. Initially, the database schema is parsed and a table tree structure is created delineating the relationships between data that are identified in the schema. In addition to accommodating relationships between main tables of data, the table tree structure also accommodates possible side tables of data, and possible circular references between tables, should such be encountered when parsing the schema. Subsequently, a migration mechanism consumes the generated table tree structure and iteratively migrates data in accordance therewith. Individual layers of the table tree structure are migrated consecutively with referenced layers being migrated prior to referencing layers. Circular links are accommodated through temporary null values, and side tables are accommodated during migration of the referencing main table. The iterative process provides completeness and fault tolerance/failure recovery.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, programmable consumer electronics, network PCs, Internet of Things (IoT), and the like. Similarly, the computing devices need not be limited to stand-alone computing devices, as the mechanisms are also practicable in distributed computing environments where tasks are performed by one or more remote processing devices, working in either series or parallel, that are linked through a communications network. In a distributed computing environment, program modules may be located in both local and remote memory storage devices.

Figure 1B:
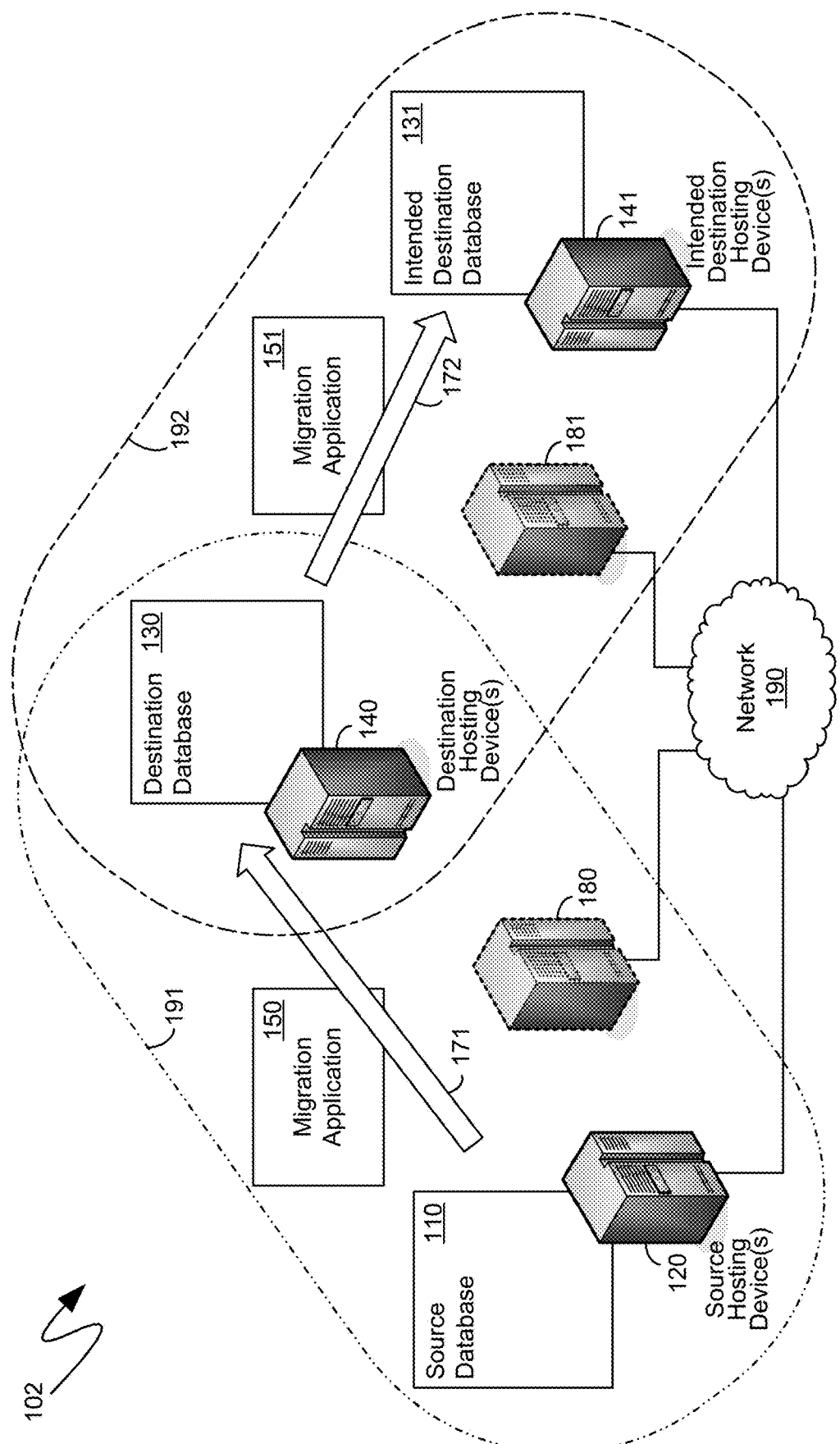

With reference to FIGS. 1a-1b, exemplary systems 101 and 102 are illustrated, providing context for the descriptions below. The exemplary system 101 of FIG. 1a illustrates three computing devices, namely the exemplary source hosting device 120, destination hosting device 140, and another computing device 180, all communicationally coupled via an network, such as the exemplary network 190. The computing devices 120, 140 and 180 illustrated in FIG. 1a are meant to be representative, either of a single computing device, or of clusters of multiple computing devices which conceptually, at a high level, operate as a single large computing device. For example, the source hosting device 120 is illustrated is hosting a source relational database, such as the exemplary source relational database 110. In implementation, the exemplary source relational database 110 is likely hosted by multiple distributed computing devices, including physical computing devices and/or virtual machines, with the physical computing devices often arranged in racks in one or more datacenters. As such, the mechanisms and actions referenced below are to be understood as being performed by any one or more such computing devices, and the data referenced below is to be understood as being stored on any one or more storage devices, whether co-located, or physically distributed apart from one another, such as in separate racks, separate datacenters, or otherwise geographically distinct. Similarly, FIG. 1a illustrates a destination hosting computing device 140, hosting a destination relational database, such as the exemplary destination relational database 130, which, in implementation, like the exemplary relational source database 110, is likely hosted by multiple distributed computing devices.

The mechanisms described herein are performed by a migration application, such as the exemplary migration application 150, which can take the form of a separate, standalone application program, or can be in the form of a subroutine, a module, an invocable script or other delineated collection of computer-executable instructions that can be invoked and executed, or interpreted, to perform the mechanisms and functions described. Additionally, the mechanisms and functions described can be implemented through the programmatic construction of defined relational database functions in accordance with known relational database languages or interfaces, such as the Structured Query Language (SQL), Contextual Query Language (CQL), Language Integrated Query (LINQ), SPARQL Protocol and RDF Query Language (SPARQL), Java Persistence Query Language (JPQL) or one of the implementations and/or dialects thereof. The exemplary migration application 150 can be executed by the source hosting device 120, the destination hosting device 140, one or more separate and independent computing devices, such as the exemplary computing device 180, or combinations thereof. For example, aspects of the migration application 150 impacting the source relational database 110 can be performed by the source hosting devices 120, while other aspects of the migration application 150, namely those impacting the destination relational database 130, can be performed by the destination hosting devices 140.

Also illustrated in the exemplary system 101 of FIG. 1a, is a migration of data from the source relational database 110 to the destination relational database 130, as graphically illustrated by the arrow 171. As utilized herein, the adjective "source" is applied to nouns, such as the source relational database 110, to signify the origin of the migration of data 171 being performed by the migration application 150. Similarly, as utilized herein, the adjective "destination" is applied to nouns, such as the destination relational database 130, to signify the terminus of the migration of data 171 being performed by migration application 150. As such, nouns identified by the adjectives "source" and "destination" are so identified on the basis of the specified origin and terminus of the migration 171, which are provided as preliminary input to the migration application 150.

The exemplary source relational database 110 is graphically illustrated in FIG. 1a as comprising multiple collections of data that refer to one another within the construct of the relational database 110, namely the exemplary tables 111, 112, 113 and 114. As utilized herein, the term "table" means a collection of individual data records each having the same fields defined by the table. As utilized herein, the term "record" means a collection of related data entries, where each data entry provides a value for a different field of the data record. As utilized herein the term "entry" means an individual value for a specific field of the data record. As utilized herein, the term "field" and the term "column" are synonyms and mean a defined category of record data. Thus, for example, and turning to FIG. 2, the exemplary tables 111 and 112 are illustrated with enumerated examples of data fields, data records and individual data entries. For example, the exemplary table 111 is illustrated as comprising information about individual people, such as would be maintained by a business or organization having those people as customers. As such, the exemplary table 111 is illustrated as comprising fields including fields such as the LastName field 222 and the FirstName field 223. Each data record within the exemplary table 111, such as the exemplary data records 227, 228 and 229 can comprise individual data entries that include values for each of those fields. For example, the exemplary data record 227 can correspond to a customer whose name is John Smith. Accordingly, the exemplary data record of 227 can comprise a data entry having a value of "John" for the FirstName field 223, and having a value of "Smith" for the LastName field 222. In an analogous manner, the exemplary data records 228 and 229 can also comprise data entries having values for each of the FirstName field 223 and the LastName field 222.

By way of another example, the exemplary table 112 is illustrated as comprising information about individual orders, such as would be maintained by a business selling one or more products. As such, the exemplary table 112 is illustrated as comprising fields, including fields such as the OrderDate field 212. Individual records in the exemplary table 112, such as the individual records 217, 218 and 219, can then each comprise individual data entries for each of the fields of the exemplary table 112. For example, the exemplary record 217, corresponding to an order that was placed on Halloween, can have a data entry having a value corresponding to the date of Oct. 31, 2020 for the OrderDate field 212.

As indicated, an advantage of relational databases is the ability of one record in one table to reference, or "relate to", another record in another table. Typically, such references are performed utilizing identifiers. For example, the exemplary table 111 can also comprise an identifier field in the form of the exemplary PersonID field 221. Such a field can comprise individual data entries specifying values by which the entire record corresponding to one such data entry can be referenced. For example, the data entry of the record 227, corresponding to a customer named John Smith, can comprise a data entry having a value of "1" for the PersonID field 221. Accordingly, other records can reference the record 227 by specifying a PersonID of "1". For example, the exemplary table 112, comprising individual records, having information about individual orders, can also comprise a PersonID field, namely the PersonID field 213. The values of data entries in the PersonID field 213 allow the corresponding records in the orders table 112 to reference individual customers from the customers table 111. For example, the data record 217 comprises a data entry having a value of "3" for the PersonID field 213, thereby indicating that the customer, whose information is contained in the record 229 in the customers table 111, which also has a value of "3" for the PersonID field 221, was the customer placed the order referenced by the data record 217. The field containing data entries whose values reference the records of another table will be referred to herein as the "referencing field", or, equally, as the "foreign key". The field containing the data entries whose values are referenced by the records of another table will be referred to herein as the "referenced field". In some instances, the "referenced field" may be the "primary key" of the referenced table, such as in the case illustrated in FIG. 2. Nevertheless, since the referenced field need not necessarily be the primary key, the term "referenced field" will be used. The adjective "referencing" will be applied to nouns from which a pointer to other data originates, and the adjective "referenced" will be applied to nouns at which the pointer from other data terminates. Thus, for example, the table 112 will be referred to as the "referencing table" end the table 111 will be referred to as the "referenced table". Similarly, the record 217 will be referred to as the "referencing record" and the record 229 will be referred to as the "referenced record".

To enable other data to reference the data of table 112, the table 112 can further comprise an identification field, such as the exemplary OrderID field 211. The OrderID field 211 can contain data entries whose values can be utilized buy data records in other tables to refer to the data records of the orders table 112. As such, the OrderID field 211 acts as the primary key for the records of table 112, in the same manner as the PersonID field 221 act as the primary key for the records of table 111. By contrast, the PersonID field 213 of the orders table 112 acts as a foreign key for the records of table 112 by which the records of table 112 reference other data records in other tables, such as, for example, the records of the customers table 111.

Having established the terminology utilized herein, reference is made back to the exemplary system 101 of FIG. 1a. For purposes of visual representation, the exemplary source relational database 110 is shown in FIG. 1a as comprising tables 111, 112, 113 and 114, with table 112 acting as a referencing table and having data records that reference the data records of the table 111, which, in that context, acts as a referenced table. Similarly, tables 111 and 114 are both shown as acting as referencing tables with respect to table 113, which, in that context, acts as the referenced table. For purposes of illustration, the exemplary destination relational database 130 illustrates equivalent tables 131, 132, 133 and 134, respectively. Moreover, the referencing and referenced relationships between the tables 131, 132, 133 and 134 are analogous to those between the corresponding tables 111, 112, 113 and 114. The exemplary tables 131, 132, 133 and 134 may already exist, in which case the migration of data 171 can comprise the addition, or "merging", of data from the tables 111, 112, 113 and 114 into the corresponding tables 131, 132, 133 and 134. Alternatively, one or more of the exemplary tables 131, 132, 133 and 134 may need to be created as part of the migration of data 171, such as in the manner detailed below.

According to one aspect, the migration application 150 comprises a table tree generation component, such as the exemplary table tree generation component 160, and a tree-traversing migration component, such as the exemplary tree-traversing migration component 170. As graphically illustrated in FIG. 1a, the exemplary table tree generation component 160 can parse the schema of the source relational database 110, which can comprise information indicating which tables are referenced by other tables, which tables are referencing other tables, and, which fields of those tables are performing the referencing, and are being referenced. Utilizing such information, such as in the manner detailed below, the exemplary table tree generation component 160 can generate a table tree structure, such as the exemplary table tree structure 161. The generated table tree structure 161 can be retained in memory, or can be persisted to a storage medium.

Subsequently, a tree-traversing migration component, such as the exemplary tree-traversing migration component 170, can read, reference, or otherwise consume the generated table tree structure 161 and can identify therefrom individual tables, specific records of those tables, and table categorization information, with which the exemplary tree-traversing migration component 170 can direct, control and otherwise implement the data migration 171, such as the manner that will be detailed below. According to one aspect, the tree-traversing migration component 170 can iteratively proceed through the generated table tree structure 161 in a sequenced, level-by-level manner, commencing with levels closer to a root node, and proceeding, level-by-level, to levels further from the root node.

In some instances, due to connectivity, storage capacity, permissions or other like limitations, the migration application 150 may not be able to migrate the data directly from the source database 110 to an intended destination database. In such instances, multiple migrations can be performed serially. For example, the exemplary system 102 shown in FIG. 1*b* illustrates the afore-mentioned data migration 171 being one of multiple migrations performed to migrate data from the source database 110 to an intended destination database, such as the exemplary intended destination database 131. More specifically, the data may be intended to be migrated from the source database 110 to the intended destination database 131. However, the migration application 150 may not be able to access the intended destination database 131, such as due to connectivity limitations, insufficient permissions, or other like limitations. An illustration of such a limited access scope of the migration application 150 is graphically represented in FIG. 1*b* as the access scope 191.

In such an instance, the data migration 171 can be performed to the destination database 130, where the destination database 130, and the corresponding destination hosting devices 140 can be accessible both by the migration application 150, and by another instance of the migration application 150, such as the exemplary migration application 151. As with the migration application 150, the migration application 151 can execute on one more computing devices, including the destination hosting devices 140, the intended destination hosting devices 141, another independent device 181, which can be analogous to the device 180, described above, or combinations thereof. The access scope of the migration application 151 is graphically represented in FIG. 1*b* as the access scope 192.

In the exemplary system 102, therefore, a first migration 171 can be performed by the migration application 150 to migrate data from the source database 110 to the destination database 130. In the event that the destination database 130 is not the intended destination database, such as the intended destination database 131, it can act as an intermediate database and a subsequent data migration 172 from the destination database 130 to the intended destination database 131 can be performed by another instance of the migration application, such as the migration application 151. Such a subsequent data migration 172 can be performed after all of data migration 171 has completed, or after only discrete portions of the data migration 171 have been completed, while other discrete portions remain in operation and/or otherwise not yet competed. Since the data migration 172 can simply be another instance of the data migration 171, the descriptions below are provided within the context of the data migration 171, utilizing the "source" and "destination" designations explicitly defined above.

Turning back to FIG. 2, the exemplary system 200 shown therein illustrates an exemplary generation of a table tree structure, such as the exemplary table tree structure 161. As illustrated, the exemplary table tree generation component 160 parses a schema of the source relational database 110, and from such information generates the exemplary table tree structure 161. For example, the schema of the source relational database 110, can delineate that the field 213 of the table 112 references the field 221 of the table 111, and, correspondingly, that the field 221 of the table 111 is referenced by the field 213 of the table 112. Utilizing such information, the table tree generation component 160 can insert, into the table tree structure 161, a node 220, corresponding to the table 112, at a level below a node 210, corresponding to the table 111, and can generate a link 225 from the node 220 to the node 210. In such a manner, the table tree generation component 160 can generate a table tree structure, such as the exemplary table tree structure 161.

Figure 2:
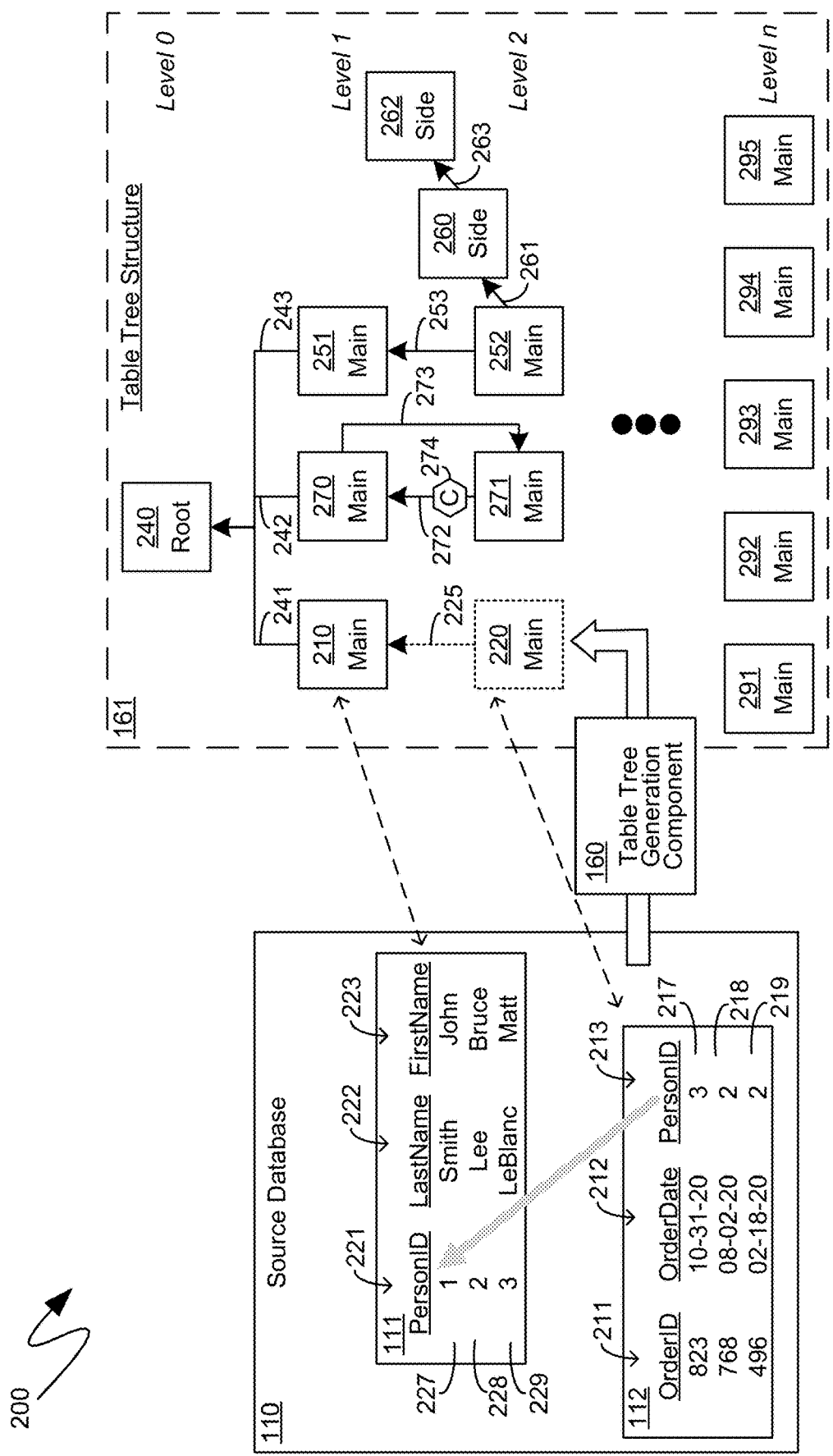
FIG. 2 is a system diagram of an exemplary system generating a table tree structure.

As graphically represented by the dashed arrows in FIG. 2, there is a correspondence between nodes in a table tree structure, such as the exemplary node 210 in the exemplary table tree structure 161, and a corresponding table in a database, such as the exemplary table 111, in the exemplary source relational database 110. As utilized herein, therefore, the terms "node" and "table node" are utilized interchangeably, and both are meant to refer to an entry in a table tree structure that corresponds to a specific table in a relational database, but is different from table itself. Accordingly, the descriptions herein will indicate that nodes "correspond to" or "represent" tables.

According to one aspect, the table tree structure 161 is data in a structured form, with individual data elements defining either individual nodes, or individual links between two nodes. The data element defining an individual node can comprise two fields, a table name field, which can identify the table in the relational database that the node represents, and a node metadata field, which can provide categorization information, such the level of the table tree structure at which the node has been placed, and whether the node is a "main" node or a "side", such as will be detailed further below. A data element defining an individual link can comprise multiple fields. As indicated, links originate with a node corresponding to a referencing table and points to, and thus terminate, with a node corresponding to a referenced table that is referenced by the referencing table. For example, the aforementioned link 225 commences at the node 220, representing the table 112, and terminates at the node 210, representing the table 111, and is an indication that the field 213, of the table 112, is a foreign key referencing the field 221, of the table 111, which acts as a primary key for the table 111. Accordingly, among the multiple fields that a data element defining an individual link can comprise are fields identifying the referencing table from which the link originates and the referenced table at which the link terminates. Additionally, the data element defining an individual link can comprise fields that identify the specific referencing column, or field, of the referencing table, such as by the name applied to such a field in the referencing table, as well as the specific referenced column, or field, of the referenced table, again, such as by the name applied to such a field in the referencing table. Data elements defining individual links can also comprise other fields, such as metadata information about the link.

As graphically illustrated by FIG. 2, a table tree structure can be organized into levels, such that individual nodes are aligned with a specific level. For purposes of the descriptions provided herein, the levels of the table tree structure 161 are numbered starting with a value of "0", with the level 0 representing the topmost layer of the table tree structure, and the level "n" representing the bottommost layer of a table tree structure having "n" individual layers. Additionally, as utilized herein, the adjective "higher", as applied to levels of a table tree structure, means levels closer to a root node, while the adjective "lower", as applied to levels of a table tree structure, means levels further from a root node. The mechanisms described, however, are equally applicable if opposite, or alternative, numbering and relationship terminology is utilized, and, as such, the scope of the descriptions provided is intended to encompass such opposite or alternative numbering and relationship terminology. For the sake of clarity, however, the descriptions below will proceed utilizing the numbering and terminology explicitly defined.

At a topmost level of the table tree structure 161, such as the level 0, one or more root nodes can represent tables within the relational database that are only referenced by other tables comprising data that is to be migrated, and which do not themselves reference any higher-level tables in so far as the data to be migrated. The exemplary table tree structure 161, shown in FIG. 2, illustrates a single root node, namely the exemplary root node 240, and, the descriptions provided below will proceed with a single root node. However, the descriptions provided herein are equally applicable to table tree structures having two or more root nodes, in which case the mechanisms described would simply be repeated for each root node.

A root node represents a table in a relational database comprising one or more records by reference to which the entirety of the data to be migrated is delineated. For example, the data of a specific business may need to be migrated from one relational database to another. In such an instance, the data to be migrated is the data that is directly or indirectly referenced by that business' records within the relational database, and the delineation of the data to be migrated is made by identifying that business. The source relational database 110, however, may comprise the records of two or more different businesses. Each business can be identified with a record in a table of businesses, and the subsequent records of those businesses, such as customer records in a customer table, order records and an order table, and so on, can, either directly or indirectly, reference the corresponding business in the table of businesses, such as by specifying a specific business identifier that acts as the primary key of the table of businesses. In such an instance, the table of businesses can be represented by a root node, such as the exemplary root node 240, and the data to be migrated will be delineated by reference to one or more specific entries in that table, such as by specifying the record corresponding to the specific business whose data is to be migrated to a different relational database.

Having established a root node 240, corresponding to a root table having one or more entries that serve as the mechanism by which the data to be migrated is identified, the table tree generation component 160 can proceed to generate the table tree structure 161 by determining which tables have records referencing the specified root table. For example, a search can be made of a schema of the source relational database 110 to determine which tables have fields that reference the specified root table, corresponding to the root node 240. In the illustrated example, three tables can be identified in the source relational database 110, and the table tree generation component 160 can generate nodes 210, 270 and 251 corresponding to those tables. The table tree generation component 160 can further generate links originating at the nodes 210, 270 and 251 and terminating at the root node 240, such as the exemplary links 241, 242 and 243, respectively. The nodes 210, 270 and 251 can be assigned to a level "1", which can be one level down from the root node, which, as described previously, was assigned level "0".

In turn, then, the table tree generation component 160 can proceed to generate the table tree structure 161 by considering the tables represented by the nodes 210, 270 and 251. For example, the generation of the node 220 and the link 225 were already detailed above. In a similar manner, the table tree generation component 160 can have parsed the schema of the source relational database 110 to search for tables that reference the table corresponding to the node 251. Having identified such a table, the table tree generation component 160 can then generate the node 252, corresponding to such a table, and can generate the link 253 originating at the node 252 and terminating at the node 251 to represent the referencing of the table corresponding to the node 251 by the table corresponding to the node 252. The nodes 220 and 252, as well as a node 271, which will be detailed further below, can be assigned to a level "2", below the level "1" assigned to the nodes 210, 270 and 251, which corresponds to tables, from the source relational database 110, that are referenced by the tables corresponding to the nodes 220, 271 and 252, respectively.

In some instances, records in one table may reference records two or more tables that are not at the same level. For example, although not visually illustrated in FIG. 2 to avoid graphical clutter and illegibility, if the table 112 referenced both the table 111 and another table corresponding to node 252, then the node 220 should not be leveled at the same level as the node 252, since there is a referential relationship commencing at the table 112, corresponding to the node 220, and terminating at the table corresponding to node 252. Instead, the node 220 should be leveled at a level 3, for example, below the level 2 assigned to the node 252. To address such situations, according to one aspect, the table tree generation component 160 can, while searching for tables that reference the table corresponding to node 252, determine that, in the present example, table 112 is one such table. A subsequent determination can then be made to find that the node 220, corresponding to table 112, is already part of the table tree structure 161, and has been assigned a level of "2". A comparison can then be made between the level assigned ("2" in the present example) and the level that would be assigned upon the second encountering of the table ("3" in the present example, since it is referencing a node 252 that is already at level 2). The lowest level (furthest from the root node) of those levels can then be selected ("3" in the present example). Any nodes linked to the node 220 can then also have their levels adjusted accordingly.

In such a manner, construction of the table tree structure 161, by the table tree generation component 160, can iteratively proceed until a bottom level, such as the level "n" is reached. As illustrated, the nodes 291, 292, 293, 294 and 295 at a bottom level can corresponded to tables, from the source relational database 110, that are not referenced by any further, lower level, tables.

As can be seen, construction of the table tree structure 161 can, according to one aspect, proceed in an iterative top-down manner. In such an aspect, tables can be detected, and nodes added to the table tree structure 161, only if those tables reference other tables whose nodes were already added to the table tree structure 161. In some instances, however, a table may reference another table where that other table is not "reachable" from the root node 240. For example, in addition to referencing the table corresponding to the node 251, the table corresponding to the node 252 also references another table, represented by the node 260. The table represented by the node 260 is not "reachable" from the specified root table (corresponding to the root node 240) in that there is no direct or indirect referencing relationship proceeding upward to the root table from the table corresponding to the node 260.

To detect such tables, in addition to determining which tables reference a given table, the table tree generation component 160 can parse the scheme of the source relational database 110 to further determine which tables are referenced by a given table. Thus, for example, while considering the table corresponding to the node 251, the table tree generation component 160 can parse the schema of the source relational database 110 to determine which tables reference the table corresponding to the node 251 and, as indicated, in such a manner, find the table corresponding to the node 252 and, thereby, insert the node 252 and the link 253 into the table tree structure 161. Additionally, while considering the table corresponding to the node 251, the table tree generation component 160 can also determine whether there are any tables that are referenced by the table corresponding to the node 251 other than tables to whose corresponding nodes links already exist such as, for example, the root table, corresponding to the root node 240, to which there is already a link 243 in the table tree structure 161. In the case of the table corresponding to the node 252, therefore, when the table tree generation component 160 considers whether there are any tables that are referenced by the table corresponding to the node 252, in addition to the table corresponding to the node 251, which was previously added to the table tree structure 161, such as in the manner detailed above, the table tree generation component 160 can further determine that there is another table that is referenced by the table corresponding to the node 252.

Since such other table does not have a corresponding node already in the table tree structure 161, a "side" node can be created to represent such a table, such as the exemplary side node 260, and a link 261 can be generated, by the table tree generation component 160, from the node 252 to the side node 260 to represent the referencing of the table corresponding to the node 260 by the table corresponding to the node 252. According to one aspect, even though the table corresponding to the side node 260 is referenced by the table corresponding to the node 252, the side node 260 is not assigned, within the table tree structure 161, a level that is higher than the level assigned to the node 252. Instead, according to such an aspect, the side node 260 can be assigned no level and the visual placement of the side node 260 between levels in FIG. 2 is meant to represent the lack of such an explicit leveling of a side node. As utilized herein, the term "side node" means a node having no path up through the table tree structure to a root node. Additionally, as utilized herein the term "side table" means a table, in a referential database, corresponding to a side node. By contrast, nodes that do have a path up through the table tree structure to a root node are referred to herein as "main nodes". Accordingly, the term "main table" means a table corresponding to a "main node".

According to one aspect, while the table tree structure is generated in a top-down iterative manner, as detailed above, when a side node is encountered, such as the exemplary side node 260, processing can temporarily proceed in an upward manner from the side node in order to determine whether there are still further side nodes off of the current side node. Thus, for example, as indicated, the table corresponding to the side node 260 can have been detected by the table tree generation component 160 by determining whether there are any additional tables, beyond those having corresponding nodes already in the table tree structure 161, that are referenced by the table corresponding to the node 252. Having identified the table corresponding to the side node 260, and having generated at the side node 260, and the link 261 from the main node 252 to the side node 260, the table tree generation component 160 can consider whether the table corresponding to the side node 260 itself references another table that does not yet have a corresponding node in the table tree structure 161. In such a manner, the table tree generation component 160 can detect a table that is referenced by the table corresponding to the side node 260 and can, in response, insert a side node to 262 in the table tree structure 161, with the side node 262 extending off of the side node 260, and having a link 263 extending from the side node 260 to the side node 262. Again, as before, the side node 262 can have no level assigned to it.

In some instances, tables may circularly reference one another. For example, a field of one table can reference a field of another table while a second, different field of that second table can, in turn, reference a second, different field of the first table. Alternatively, such circular referencing may be indirect, with multiple intermediate tables, but with references between the tables ultimately creating a referencing loop. To accommodate such circular referencing, according to one aspect, the table tree generation component 160 can mark at least one link in such a circular referencing loop as a circular link, which can then be processed differently than other links by the tree-traversing migration component 170, as will be detailed further below. For example, while focusing on the table corresponding to the node 270, the table tree generation component 160 can, from parsing the schema of the source relational database 110, determine that the table corresponding to the node 271 references the table corresponding to the node 270. Accordingly, the table tree generation component 160 can generate a node 271, corresponding to such a table, at a level below the node 270, and can generate a link 272 from the node 271 to the node 270. Subsequently, when focusing on the table corresponding to the node 271, the table tree generation component 160 can, from parsing the scheme of the source relational database 110 in order to find tables that reference the table corresponding to the node 271, determine that the table corresponding to the node 270 references the table corresponding to the node 271. Since a node 270 already exists in the table tree structure 161, and at a higher level than the node 271, the determination that the table corresponding to the node 270 references the table corresponding to the node 271 can result in the table tree generation component 160 detecting a circular link. In response, according to one aspect, the table tree generation component 160 can generate the link 273, originating with the node 270, and terminating at the node 271, and additionally, the table tree generation component 160 can also mark as circular 274 the previously generated link originating with the node 271, namely the exemplary link 272. As indicated previously, such a marking can be in the form of information stored in the metadata field of the data delineating the link 272. Subsequently, when migrating the data in accordance with table tree structure, links marked as circular can cause the tree-traversing migration component 170 to operate in a different manner, as will be detailed below.

Figure 3A:
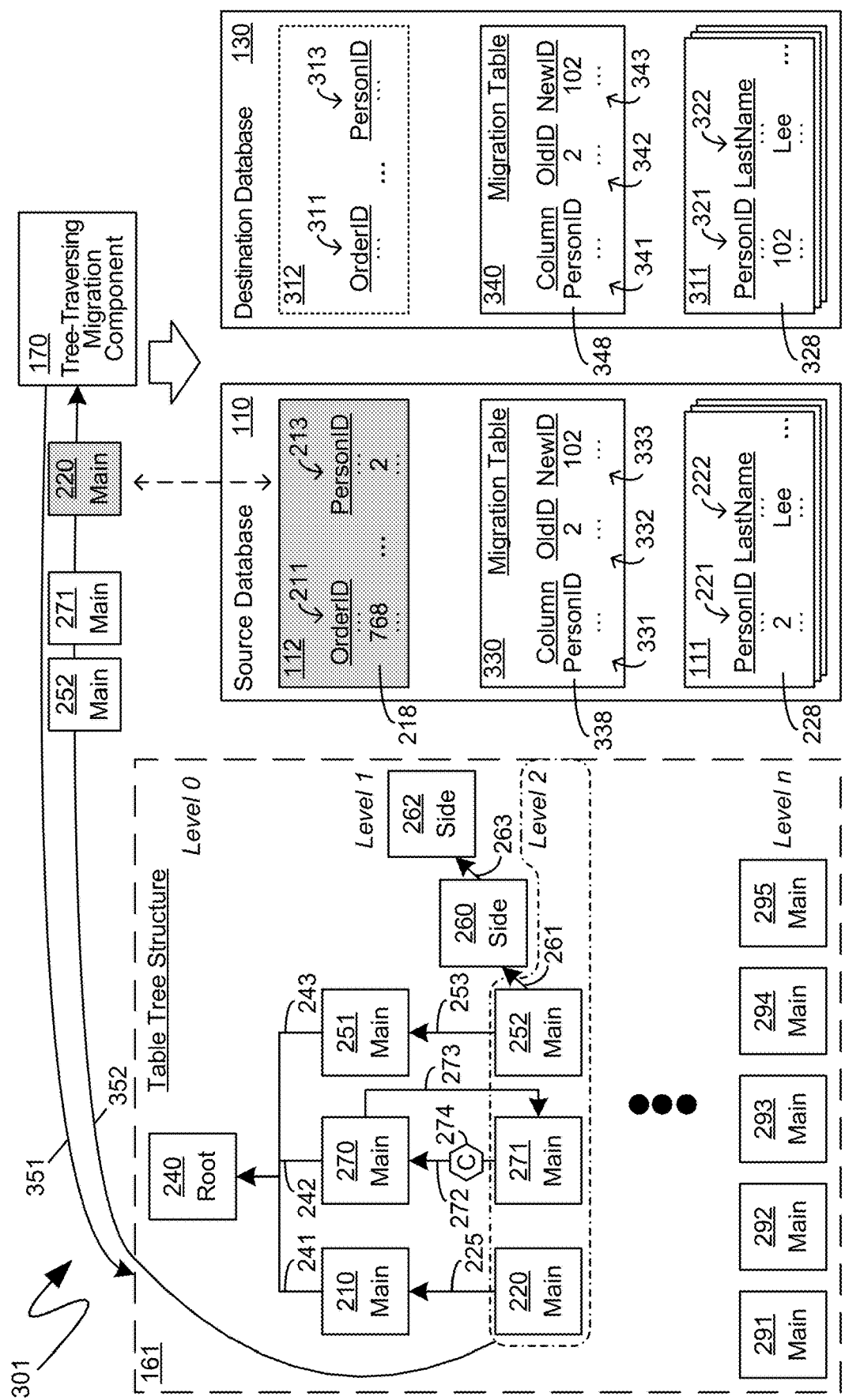
FIGS. 3a-3d are system diagrams of an exemplary system performing migration between relational databases utilizing a table tree structure.

Turning to FIG. 3a, the exemplary system 301 shown therein illustrates an exemplary migration of data from the source relational database 110 to the destination relational database 130 as coordinated by a tree-traversing migration component, such as the tree-traversing migration component 170. More specifically, the tree-traversing migration component 170 can reference, read, consume or otherwise utilize the table tree structure 161, the generation was detailed above, to perform the data migration. According to one aspect, the tree-traversing migration component 170 can obtain, as illustrated by the arrows 351 and 352, information from the table tree structure 161 in a level-by-level manner. For example, the tree-traversing migration component 170 can sort the nodes of the table tree structure 161 in accordance with the levels assigned to such nodes, such as in the manner detailed above. The tree-traversing migration component 170 can then iteratively consider the nodes in a level-by-level manner.

For example, the exemplary system 301 shown in FIG. 3a illustrates the tree-traversing migration component 170 iterating through the nodes of level "2", such as the nodes 252, 271 and 220. More specifically, the exemplary system 301 illustrates the tree-traversing migration component 170 focusing on the node 220, corresponding to the table 112 in the source relational database 110, as illustrated by the dashed arrows. As will be detailed below, the tree-traversing migration component 170 can utilize the information from the table tree structure 161, as well as information from migration tables, such as the exemplary migration tables 330 and 340, to facilitate the migration of data, such as the exemplary record 218, from the table 112, in the source relational database 110, to the table 312 in the destination relational database 130.

As indicated previously, the exemplary table 112 was shown with an exemplary record 218 containing information about a specific order having an identifier "768", and, among the information contained in the record 218 is that the order was placed by a customer who is referenced by an identifier of "2". As also indicated previously, the source relational database 110 can comprise another table such as, for example, the table 111 that can be referenced by the table 112. For example, the customer referenced by an identifier of "2" in the record 218 can be the customer of the record 228, of the table 111, having a customer identifier of "2". However, when the data of the table 111 is migrated from the source relational database 110 to the destination relational database 130, such as by being merged into the table 311 on the source relational database 130, the identifier assigned to a particular record may be different than the identifier assigned to the corresponding record in the source relational database 110. For example, the exemplary system 301, shown in FIG. 3a, illustrates that the data from the table 111 can have already been migrated over to the destination relational database 130 into the corresponding table 311. In particular, the exemplary record 228, from the table 111 in the source relational database 110 is illustrated as having been migrated over in the form of the exemplary record 328 in the table 311. As can be seen, the record 328, in the table 311, in the destination relational database 130, carries an identifier of "102". Accordingly, to reference the record 328 in the destination relational database 130, the identifier "102" must be utilized, and not the identifier "2" previously utilized by the record 228 in the source relational database 110.

According to one aspect, so that the correct referencing can occur in migrated data, one or more migration tables, such as the exemplary migration tables 330 and 340 can be created and utilized, such as by the tree-traversing migration component 170. Within the exemplary system 301, each of the source relational database 110 and the destination relational database 130 can have their own copy of the migration table, such as the exemplary migration tables 330 and 340, respectively, and, accordingly, the mechanisms below will be described with reference to two migration tables, one on each of the source and destination databases. The mechanisms detailed below, however, are equally applicable to a single migration table jointly referenced between the two databases, or three or more migration tables, such as redundant migration tables, backup migration tables and the like.

Migration tables, such as the exemplary migration tables 330 and 340, can comprise records having multiple fields. Among such fields can be a field identifying the column being referenced, also referred to herein as the "primary key", a field that specifies the old identifier utilized by such a primary key, namely in the source database 110, and the new identifier utilized by such a primary key, namely in the destination database 130. For example, as illustrated in FIG. 3a, the migration table 330 in the source database 110 can comprise a field 331 that can identify a primary key, such as the exemplary "PersonID" column 221 of the table 111, a field 332 that can identify the old value, such as "2" assigned to a record 228 and being the data entry of that record 228 in the field 221 whose name is specified by the field 331, and a field 333 that can identify the new value, such as "102" assigned to a migrated version of that same record, namely the record 328 on the destination database 130, and being the data entry of that record 323 in the field 321 whose name is specified by the field 331. The exemplary migration table 330 is shown comprising one such record in the form of the record 338, entity corresponding migration table 340 is shown having a corresponding record 348. Additionally, the exemplary migration table 340 is shown as having fields 341, 342 and 343 that are analogous to the fields 331, 332 and 333 detailed above.

In addition to the fields detailed above, migration tables, such as the exemplary migration tables 330 and 340, can comprise other fields including, for example, fields specifying the name, or other identification, of the table having the record whose information is stored in a given record, such as the record 338, of a migration table, fields specifying a unique identification for the migration so that, for example, records generated during one migration can be filtered independently from records generated during a different migration, an identifier field that can provide a unique identifier for each record in the migration table, and other like records. The migration of data from the source relational database 110 to the destination relational database 130 can then be implemented by the tree-traversing migration component 170 with reference to both the table tree structure 161, as indicated, and also with reference to data from the migration table, such as the exemplary migration tables 330 and 340. The migration of the data of the exemplary table 112, in accordance with the mechanisms described, is illustrated in FIGS. 3b-3d.

Figure 3B:
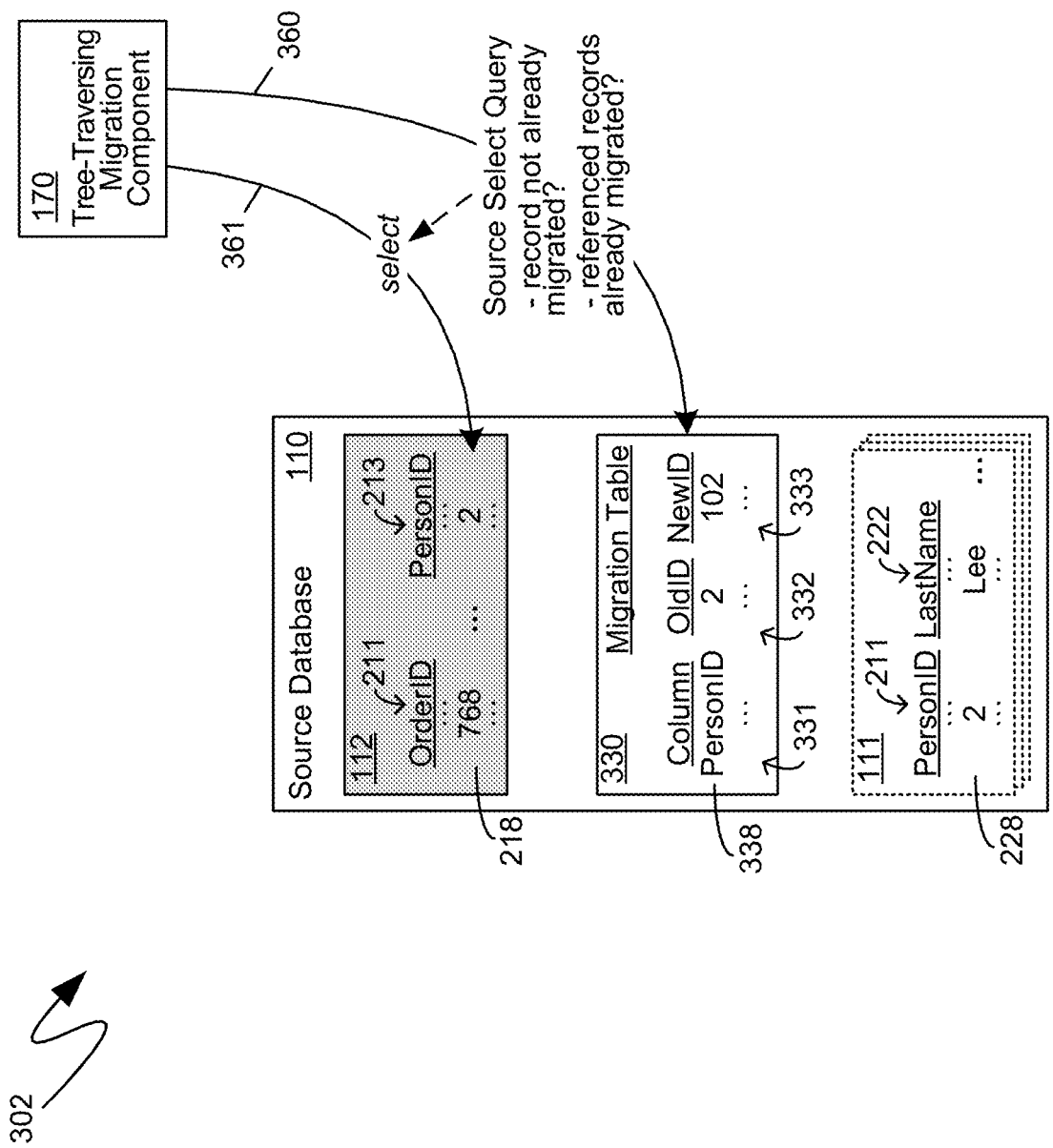

Turning first to FIG. 3b, having selected the table 112, based on its traversing of the table tree structure 161, as detailed above, the tree-traversing migration component 170 can initially perform a source select query, such as the exemplary source select query 360 shown an exemplary system 302 of FIG. 3b. If multiple instances of the tree-traversing migration component 170 are being executed, with separate instances being executed by the source database and the destination database, the source select query 360 can be performed by one or more computing devices associated with the source database 110. As illustrated, the source select query 360 can inform which records of the table 112 are selected for migration. More specifically, the source select query 360 can check, such as with reference the migration table 330, locally maintained as part of the source database 110, whether a record currently being focused upon by the tree-traversing migration component 170, such as the exemplary record 218, has already been migrated. Additionally, the source select query 360 can also check whether any records referenced by the records 218, such as, for example, the record 228 whose customer is identified by the entry of the records 218 in the PersonID field 213, has already been migrated to the destination database 130 (not shown in FIG. 3b). If the record 218 being focused upon by the tree-traversing migration component 170 has not already been migrated, but the records referenced by such a record have already been migrated, then the record 218 can be can be migrated. The source select query 360 is illustrated as determining whether the record 218 is selected 361 for migration, with such a selection 361 being in the form of a reading of the data out of the record 218, such as in accordance with a "Select Query" or other like function defined by the language utilized to interact with the relational database 110. In particular, the functionality detailed can be performed by programmatically generated queries having conditionals in accordance with the determinations detailed above.

Figure 3C:
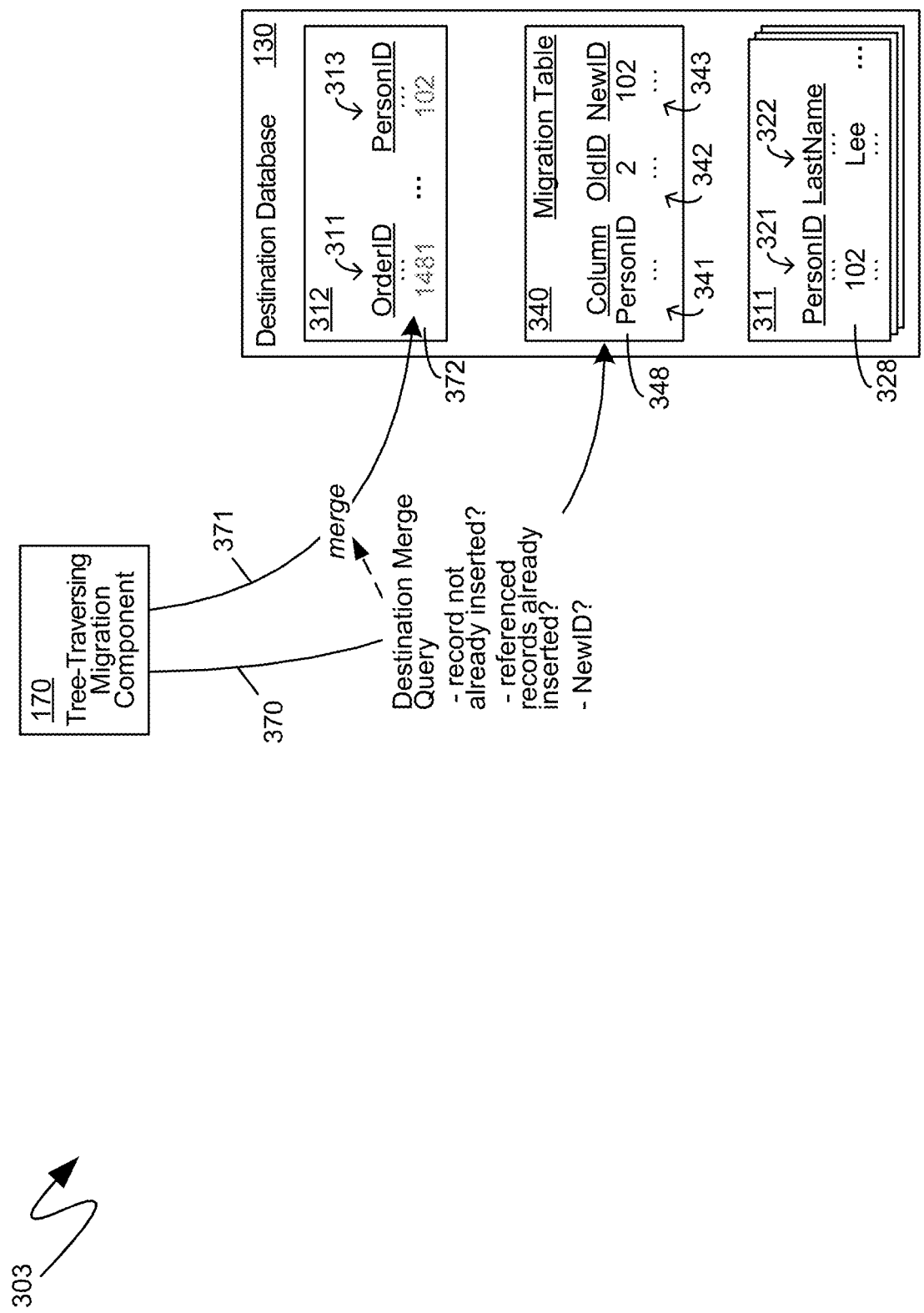

Turning to FIG. 3c, the exemplary system 303 illustrates the subsequent merging of data that was read from the record 218, such as in the manner illustrated by the exemplary system 302 of FIG. 3b, and detailed above. As before, if multiple instances of the tree-traversing migration component 170 are being executed, with separate instances being executed by the source database and the destination database, the destination merge query 370 can be performed by one or more computing devices associated with the destination database 130. As illustrated, the destination merge query 370 can inform whether the records are merged into a table on the destination database 130, such as the exemplary table 312. More specifically, the destination merge query 370 can perform analogous checks to those detailed above with respect to the source select query, such as with reference the migration table 340, locally maintained as part of the destination database 130, whether a record currently being migrated over has already been migrated and whether any records referenced by the record being migrated, have already been migrated to the destination database 130. If the record being migrated has already been migrated, been no further action need be performed, with the possible exception of an update of one or more migration tables, thereby enabling recovery from disruptions in the migration and other like fault resilience. Conversely, if the record being migrated has not already been migrated, but the records referenced by such a record have already been migrated, then the record can be can be migrated and, thereby, inserted into the destination table 312, such as the record 372. As part of the merging, or as part of the reading detailed above, a migration table, such as the exemplary migration table 340, can be referenced in order to change an old identifier to a new identifier so that the reference performed by the record being migrated remains accurate on the destination database. For example, the record 372 is illustrated as having a PersonID of "102", which references the same customer in the table 311, as the PersonID of "2" did in the corresponding table 211 in the source database 110 (neither shown in FIG. 3c). As indicated, such a change can be informed by the information retained in a migration table, such as the exemplary migration table 340. The destination merge query 370 is illustrated as determining whether the record 372 is merged into the table 312, with such a merge 371 being in the form of a writing of data into the record 372, such as in accordance with a "Merge Query" or other like function defined by the language utilized to interact with the relational database 130. In particular, the functionality detailed can be performed by programmatically generated queries having conditionals in accordance with the determinations detailed above.

Figure 3D:
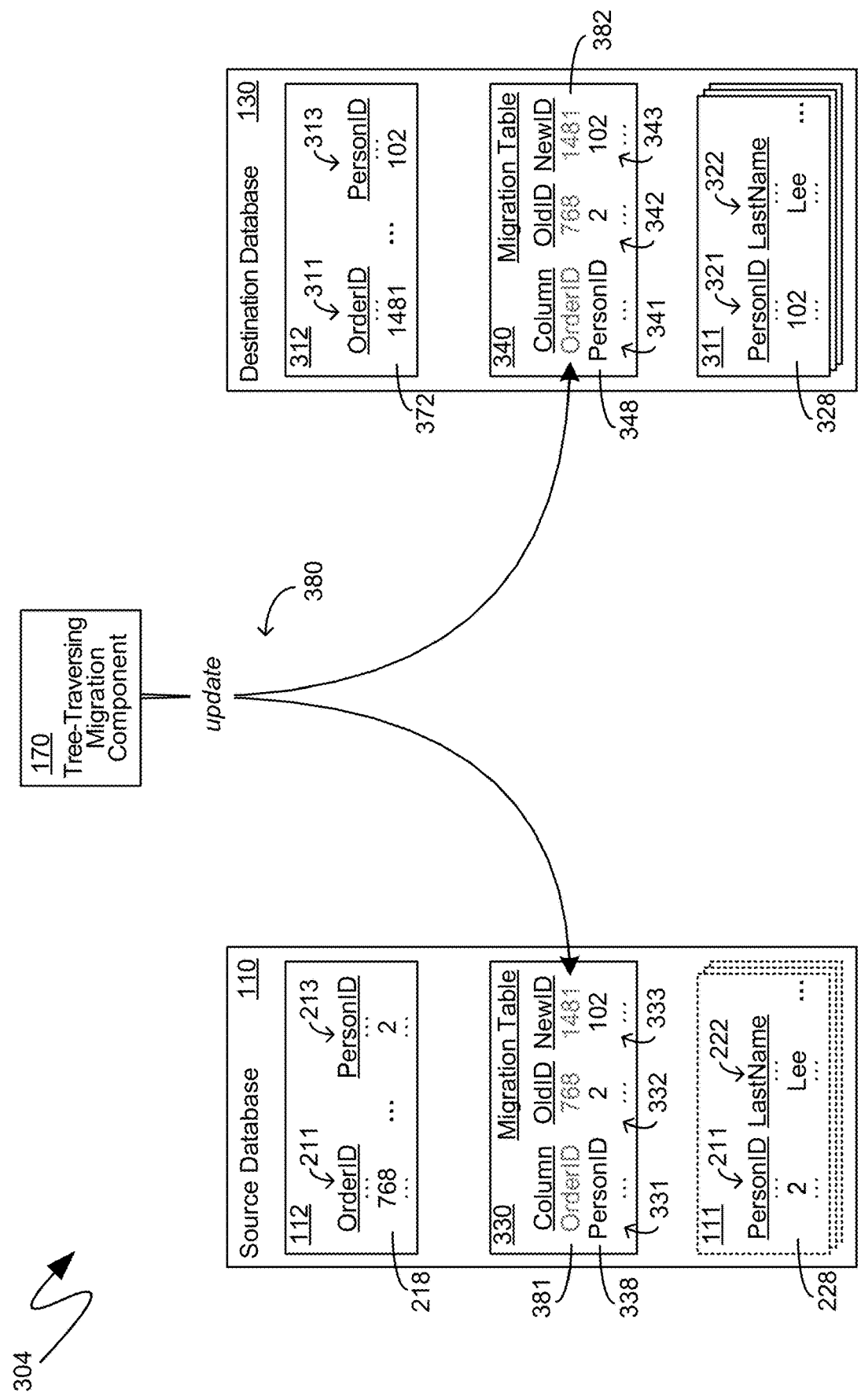

Turning to FIG. 3d, the exemplary system 304 shown therein illustrates an exemplary completion of a migration of a specific data record in accordance with the mechanisms described herein. More specifically, as illustrated, the merging of the data of the record 218, from the table 112 in the source database 110, into the corresponding table 312 on the destination database 130, can result in the generation of a record 372 in the table 312. The record 372 can comprise an identifier, such as in the form of the Order ID that can be different from the identifier of the record 218. Accordingly, such different identifiers and corresponding information can be added to the migration table including, for example, the migration table 330, on the source database 110, and the corresponding migration table 340, on the destination database 130. The tree-traversing migration component 170 is illustrated as performing an update 380 which can add a record 381, into the migration table 330, and a corresponding record 382, into the migration table 340. Such an update can be directed to one migration table, and then copied over to the other migration table, can be performed simultaneously, independently, or in any other manner that ensures the relevant data is part of at least one migration table. As illustrated, the added record 381 can identify the field, such as the OrderID field 311 in which the identifier for the record being migrated, such as the exemplary record 218, is stored. As indicated previously, such a field is known as the "primary key". Additionally, the added record 381 can identify the old identifier of the primary key, maybe the identify utilized in the source database 110, and the new identifier of the primary key that was assigned when the record was merged into the destination database 130, such as in the form of the record 372. In such a manner, the tree-traversing migration component 170 can perform migration of delineated data between two relational databases.

Figure 4:
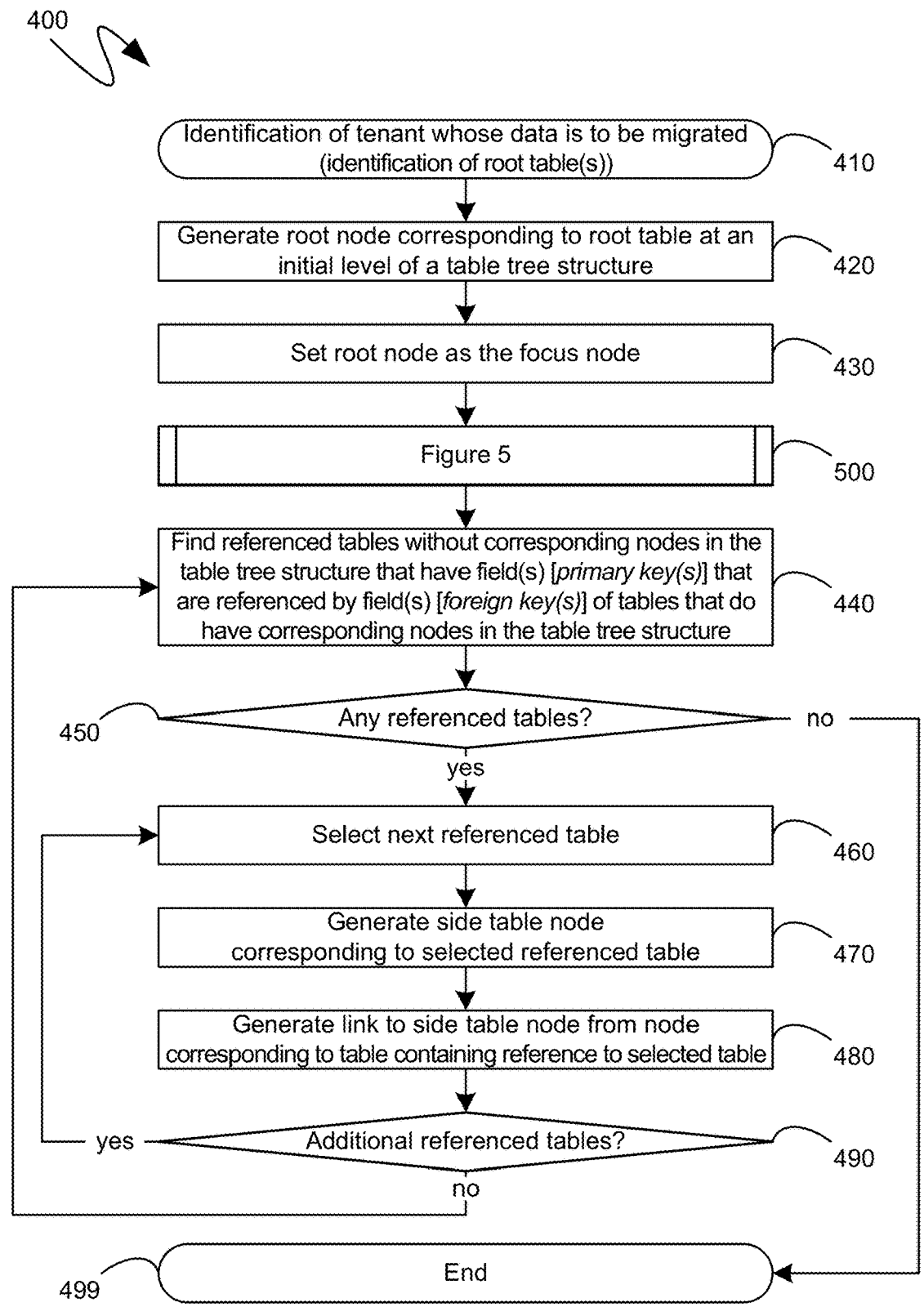
FIG. 4 is a flow diagram of an exemplary generation of a table tree structure.
Figure 5:
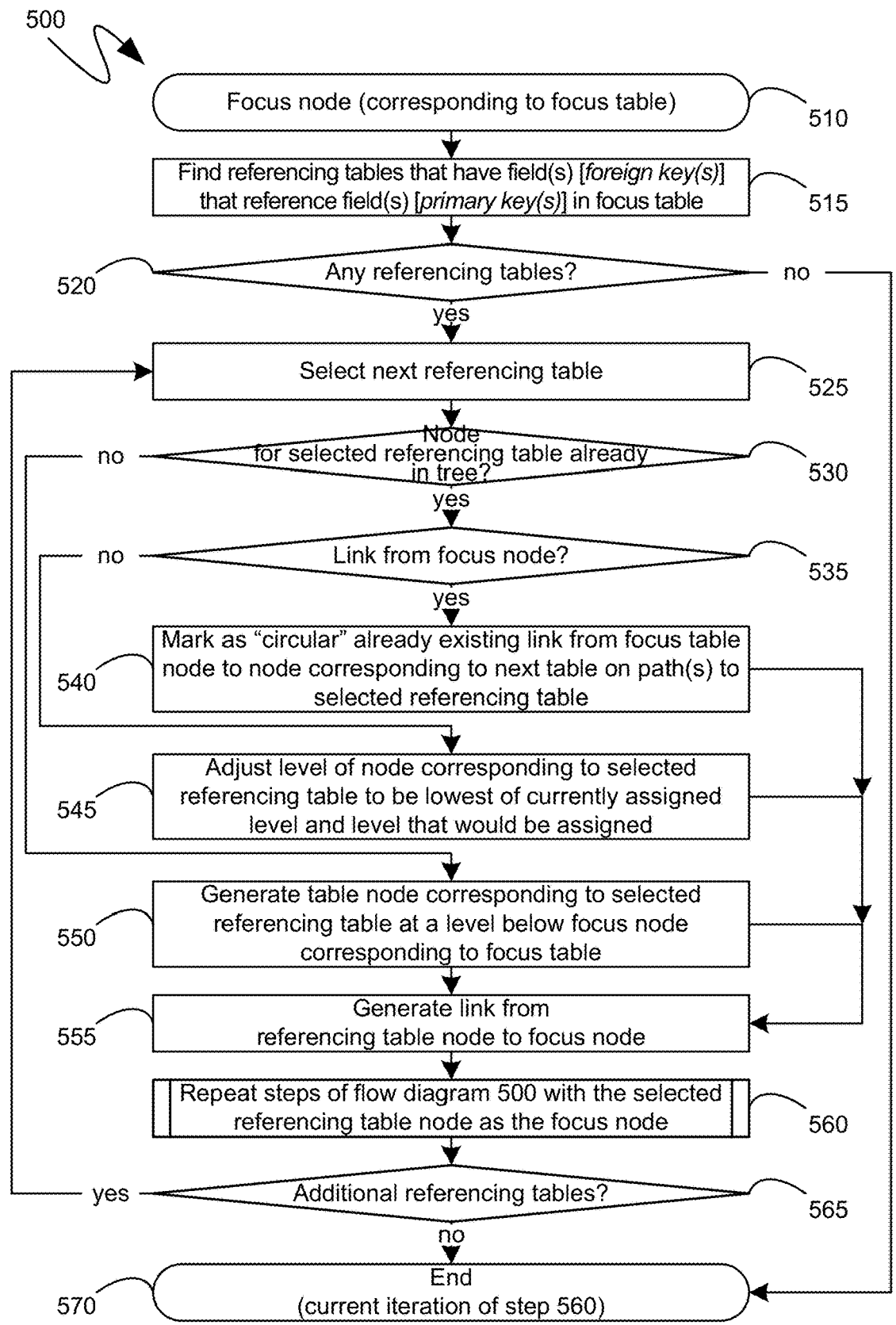
FIG. 5 is a flow diagram of an exemplary portion of a generation of a table tree structure.

Turning to FIG. 4, the exemplary flow diagram 400 illustrates an operation of an example of a table tree generation component in accordance with the mechanisms whose more complete scope was detailed above. The exemplary flow diagram 400 is an example only, and steps in other orders, and with other types of iterative processing, can equally perform the mechanisms described in detail above. Turning to the exemplary flow diagram 400, processing can commence with step 410 at which point input in the form of an identification of a tenant whose data is to be migrated, or other like delineation of the data to be migrated, can be received. The input of step 410 can include the identification of one or more root tables. The generation of a table tree structure, such as that detailed above, can commence with step 420 with the generation of a root node, corresponding to the identified root table, at an initial level of the table tree structure. As indicated previously, such an initial level will be designated as a "highest" level, with "lower" levels having nodes corresponding to tables that reference the root table, and, can be assigned a numerical level value, such as "level 0", with lower levels having higher numerical values sequentially assigned to them. At step 430, the root node can be set as the node on which the steps of the flow diagram 500 of FIG. 5 are performed. Due to the iterative nature of the mechanisms described herein, the adjective "focus" is applied to nouns, such as a "focus node", a "focus table, a "focus record", and the like to signify that that element is the element currently being processed by the current iteration of the mechanisms. With the setting of the root node as the focus node, at step 430, an iteration of the steps of the exemplary flow diagram 500 of FIG. 5 can then be performed. Before proceeding with the remaining steps of the exemplary flow diagram 400 of FIG. 4, the descriptions provided will first turn to the exemplary flow diagram 500 of FIG. 5.

Turning to FIG. 5, the current focus node, such as the root node in the current iteration, can be received at step 510. At step 515 referencing tables can be found by parsing the schema of the source relational database. As utilized herein the term "referencing tables" means tables that have one or more fields, also referred to as "foreign keys", that reference fields, also referred to as "referenced fields", in the table corresponding to the focus node. Such tables are referencing tables, and the table they reference, namely the table corresponding to the focus node, also referred to herein as the "focus table", is the referenced table. At step 520, if no referencing tables are found at step 515, then processing can and at step 570 which, as indicated, can be a termination of a current iteration, and processing can return to a prior iteration. In particular, at step 520, if no referencing tables are found, then the focus node is at a bottom of the table tree structure, in so far as the current iterative path down this leg of the table tree structure is concerned.

Conversely, if, at step 520, referencing tables were found in the parsing of the schema at step 515, processing can proceed to step 525 in which an iterative loop can select each of those referencing tables in turn. Initially, at step 525, the next referencing table, which is not already been processed, is selected. At step 530, a determination is made as to whether a node corresponding to the selected referencing table is already in the table tree structure. Such a determination can be utilized to detect if an existing node needs to be releveled and can also be part of a detection of circular references. If a node corresponding to the referencing table is already in the tree, as determined at step 530, then, at step 535, a further determination can be made as to whether that node is linked to, either directly or indirectly, by the focus node. If such a determination of step 535 is positive, then it can indicate a circular reference and processing can proceed to step 540, where accounting for the circular reference can occur. More specifically, at step 540, an already existing link from the focus node to the node corresponding to the selected referencing table can be marked as "circular", such as by adding the appropriate data or indicator to a field of the already existing link. In addition, at step 555, a link in the opposite direction, namely from the already present node, corresponding to the selected referencing table, to the focus node can be added.

Conversely, if, at step 530, it is determined that a node corresponding to the referencing table is already in the table tree structure, but, at step 535, it is determined that it is not a circular link, then processing can proceed to step 545 where the level already assigned to the node corresponding to the referencing table selected at step 525 is compared to the level that would have been assigned during the current iteration, such as at step 550. As described above, the lowest level of those two levels, meaning the level furthest from the root node, can be selected to provide that both the prior table that was referenced by the referencing table selected at step 525, and the current focus table of step 510, are both at a level higher than the referencing table and, thereby, that both tables' records will have already been migrated by the time the records of the referencing table are selected for migration.

If the determination, at step 530, determines that a node corresponding to the referencing table selected at step 525 is not already in the table tree structure, processing can then proceed to step 550 where a node corresponding to the selected referencing table can be generated and added to the table tree structure. As indicated previously, the creation of such a node, and its addition to the table tree structure, can be in the form of a data record defining such a node through data values entered in fields such as a table name field, and a metadata field, which can indicate whether the node corresponds to a main table, or a side table. Additionally, the processing of a subsequent step, namely step 555, can entail the addition of a link into the table tree structure, with such an added link commencing at the node generated at step 550 and terminating at the focus node. As indicated previously, the creation of such a link, and its addition to the table tree structure, can be in the form of a data record defining such a link through data values entered in fields such as a referencing table field, a referenced table field, a referencing column name, a referenced column name, and metadata, such as information indicating whether the link is circular.

According to one aspect, the processing of the exemplary flow diagram 500 can be performed in an iterative manner such that, prior to proceeding to another of the referencing tables detected at step 515 for a current focus node, the table tree structure can be constructed following a current path all the way to a bottom node that has no further tables referencing the table corresponding to such a bottom node. Accordingly, at step 560, the steps of the flow diagram 500 can be iteratively performed with the node generated at step 550 now being made to the focus node, and the steps of the exemplary flow diagram 500 being performed again. For purposes of completeness of description, if the referencing table selected at step 550 corresponds to a bottom node, then the iterative performance of flow diagram 500 at step 560 can determine, at such a subsequent performance of step 520, that there are no referencing tables. The current iteration of the steps of the flow diagram 500 can then end at step 570, and processing can return to a prior iteration of the performance of the steps of the flow diagram 500. Such a prior iteration can then proceed with step 565, at which point a determination can be made as to whether there are any further unprocessed referencing tables that were detected at step 515 during such a prior iteration of the performance of the steps of the flow diagram 500. If there are, then processing can return to step 525, and the iterative processing can proceed down a different branch of the table tree structure, generating such a branch of the table tree structure along the way.

Returning back to the exemplary flow diagram 400 of FIG. 4, once the iterative processing of the flow diagram 500 of FIG. 5 has been completed, such that there are no further iterations, processing can proceed with step 440, where the identification of any potential side tables, such as detailed above, can be performed and side nodes corresponding to such side tables can be added to the table tree structure. In particular, at step 440, tables can be found that are referenced by tables corresponding to nodes that are already in the table tree structure, also referred to as "referenced tables". Stated utilizing alternative terminology, tables having referenced fields, which are referenced by the foreign keys of the tables that already have corresponding nodes already added in the table tree structure, can be found at step 440. At step 450, if there are no such tables, then the table tree structure generation can end at step 499.

Conversely, if, at step 450, side tables are detected, then processing can proceed to step 460, where a next side table, which is not been previously processed by the steps of the flow diagram 400, can be selected. At step 470, a side table node, corresponding to the table selected at step 460, can be generated and added to the table tree structure in the same manner as the addition of the main table node, which was detailed above. At step 480, a link from the node, already in the table tree structure, corresponding to the table referencing such a side table, can be added, with the link terminating at the node generated by step 470. The addition of the link can be in the same manner as the addition of the other links detailed above. At step 490, a determination can be made as to whether there are any additional referenced tables that were found during a prior iteration of step 440. If there are, then processing can return to step 460 and the next one of such referenced tables can be selected. By contrast, if, at step 490, it is determined that there are no further referenced tables, processing can proceed to step 440 where another search for referenced tables can be performed, this time detecting tables that are referenced by tables corresponding to the newly added side nodes, in other words, side tables off of side tables. With reference back to FIG. 2, for example, an initial performance of step 440 can have detected the table corresponding to the node 260, which is referenced by the table corresponding to the node 252, that was already in the table tree structure from the performance of the steps of the flow diagram 500 of FIG. 5. However, such an initial performance of step 450 may not have detected the table corresponding to the side node 262, since such a table is not referenced by any table whose node is currently in the table tree structure. Consequently, a subsequent performance of step 440, as indicated, can detect the table corresponding to the side node 262, since such a table can be referenced by a table having a node that is currently within the table tree structure, namely the table corresponding to the side node 260, which was added during a prior iteration of step 470. If no referenced tables are detected at step 450, then there are no further side tables and the construction of the table tree structure can end at step 499.

Figure 6:
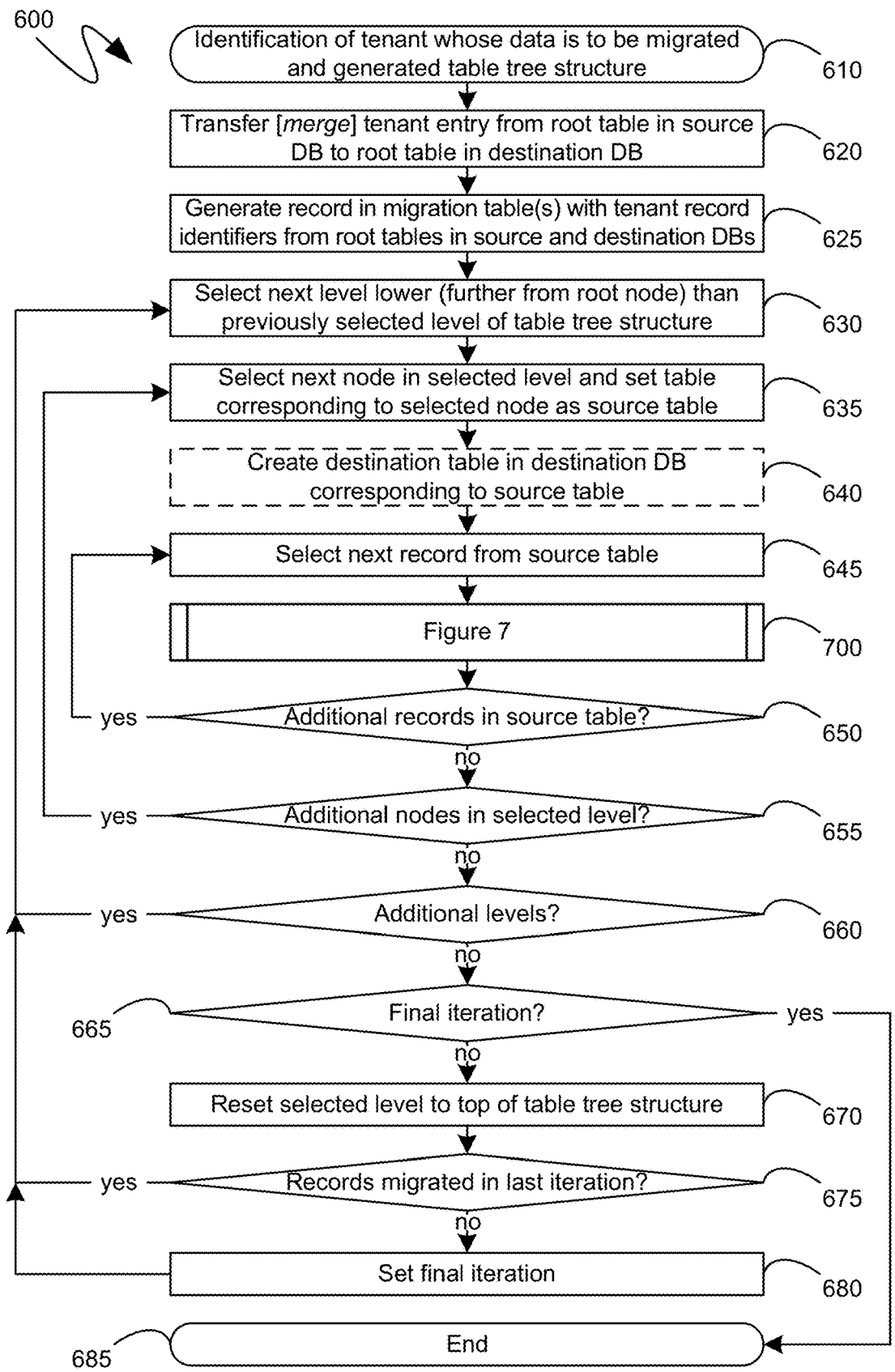
FIG. 6 is a flow diagram of an exemplary data migration between relational databases utilizing a table tree structure.

Turning to FIG. 6, the exemplary flow diagram 600 shown therein illustrates an exemplary series of steps that can be performed, such as by a tree-traversing migration component, to perform the data migration in accordance with the mechanisms whose more complete scope was detailed above. As before, the exemplary flow diagram 600 is an example only, and steps in other orders, and with other types of iterative processing, can equally perform the mechanisms described in detail above. Initially, at step 610, input can be received in the form of the table tree structure of regeneration was detailed previously. Additionally, step 610 can include an identification of the tenant whose data is to be migrated. At step 620, one or more entries corresponding to an identified tenant can be transferred from the root table in the source database to the root table in the destination database. As indicated previously, such a transfer can be performed utilizing a merge command, or other like programmatically constructed command in accordance with the interface language utilized by the relational database.

At step 625, one or more migration tables, such as those details previously, can be updated to reflect new identifiers assigned to the migrated records of the route table. More specifically, and as detailed above, the primary key of the records that were migrated from the root table in the source database to the root table in the destination database, at step 620, can have changed such that a different identifier is utilized for such records in the destination database than was utilized in the source database. An identification of the primary key, and the two identifiers utilized for the migrated record, namely the identifier in the source database, and the new identifier and the destination database, can be added to the migration table, such as by generating a new record in the migration table having values for the relevant fields such as, a field identifying the name of the table being migrated, a field identifying the name of the column that is the primary key, the old identification, utilized in the source database, for the record being migrated, the new identification, utilized the destination database, for the record being migrated, and other like fields.

Having completed migration of delineated data from the root table, processing can proceed to step 630, and a lower level of the table tree structure can be selected. As indicated previously, the selection, at step 630, can be in the form of a selection of nodes from the table tree structure assigned a level corresponding to the next lower level from a previously selected level. In the present iteration, the previously selected level can have been the root node, or "level 0", and, accordingly, during a first iteration of step 630, nodes assigned to "level 1" can be selected. The level selected at step 630 can comprise multiple nodes. One of such nodes can be selected at step 635, and the table corresponding to the selected node can become the source table for the migration of records during the current iteration of the steps of the flow diagram 600.

An optional step 640, which can be performed subsequent to step 635, or at another relevant time, can create a corresponding table on the destination database if no table corresponding to the source table of step 635 already exists on the destination database. If such a destination table already exists, then step 640 need not be performed, and, as such, it is illustrated via dashed lines in FIG. 6. Typically, the destination table will already exist due to its creation prior to the commencement of the migration performed according to the mechansisms described herein. At step 645, the next record to be migrated from the source table can be selected, and such a record can be migrated in accordance with the steps of the flow diagram 700 of FIG. 7. Before proceeding with the remainder of the steps of the flow diagram 600 of FIG. 6, a description is provided of the data migration steps of the flow diagram 700 of FIG. 7.

Figure 7:
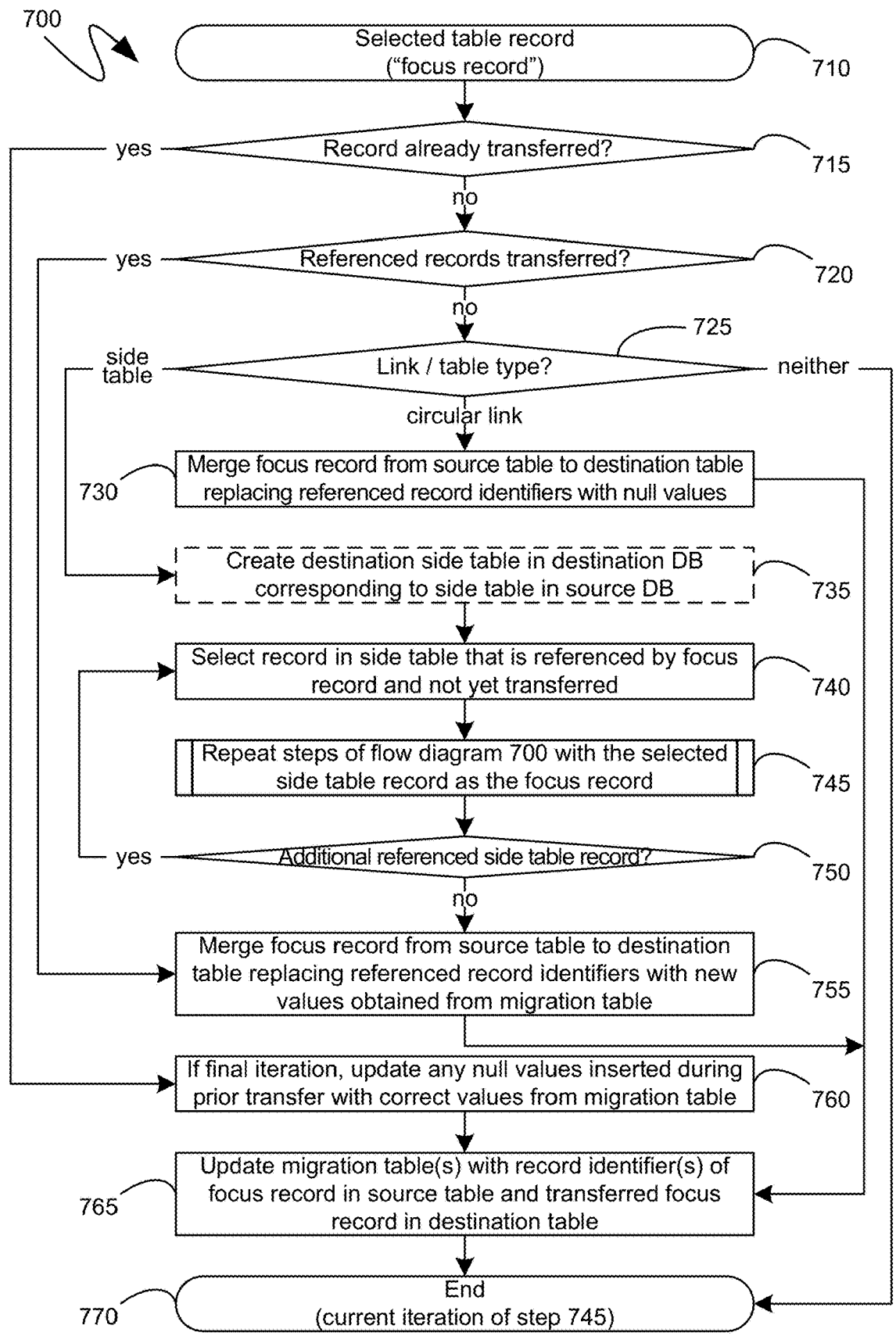
FIG. 7 is a flow diagram of an exemplary portion of the data migration between relational databases utilizing a table tree structure.

The steps of FIG. 7, and the loop of FIG. 6 defined by steps 645 and 650, illustrate a record-by-record migration. An outer loop then defined by steps 655 and 635 illustrate table-by-table migration. Such illustrations are provided for clarity of description, since a single-record migration is simplest to describe and comprehend. Accordingly, the descriptions build off of such a description. In practice, however, the looping initiated by the decision of step 650 need not be performed. Instead, rather than selecting records on an individual record-by-record basis at step 645, a programmatically generated query can select records meeting the conditionals of FIG. 7 from the table selected as the source table at step 635, as a single selection and the collection of records can be singly processed as a whole. Alternatively, or in addition, multiple programmatically generated queries can select the records as a single step without, again, having to iterate through the records individually on a record-by-record basis. In such an instance, the decisions illustrated in FIG. 7 are, as indicated, programmatic conditionals implemented by the one or more queries that first select the multitude of matching records in a singular event and then subsequently in the one or more merges that insert those records, also a singular programmatic event. The descriptions below, provided for detail on a record-by-record basis, are meant to be understood as also encompassing such programmatically generated queries and merges.

Turning, then, to FIG. 7, the exemplary flow diagram 700 can commence with step 710 at which point a selected table record can be received. For ease of reference, such a record will be referred to subsequently as the "focus record", in accordance with the terminology defined above. At steps 715 and 720, the determinations detailed above with respect to the source select query 360, shown in FIG. 3b, and the destination merge query 370, shown in FIG. 3c. More specifically, at step 715, a determination can be made whether the focus record has already been transferred, and, if it has not, a determination can be made, at step 720, whether the records referenced by such a focus record have themselves been previously transferred. As detailed above, such determinations can be made with reference to migration tables which can comprise records of each migrated record. Although illustrated as single steps, the steps of 715 and 720 can be performed individually and separately on the source database, such as when the focus record is being selected for migration, and on the destination database, such as when the focus record is being merged into a destination table. If the performance of step 715 determines that the focus record has already been transferred, then such a determination is the result of the specialized processing of circular links and processing can proceed to step 760, which will be described in further detail below. Conversely, if the performance of step 715 determines that the focus record has not already been transferred, but the performance of step 720 determines that the records referenced by the focus record have also not been transferred, then such a determination can trigger the specialized processing of either circular links or links to side tables, which will also be described in further detail below.

The present description, however, proceeds with what is likely to be a primary sequence of steps that will migrate a majority of data. In particular, such a sequence of steps entails the determination, at step 715, that the focus record has not already been migrated, and further entails the determination, at step 720, that the records referenced by the focus record have, in fact, already been migrated. In such an instance, processing can proceed to step 755, as shown by the exemplary flow diagram 700 of FIG. 7. At step 755, the focus record can be selected on the source database and merged into a corresponding table in the destination database. As part of the performance of step 755, foreign key values of the focus record can be updated so that they reference the same records on the destination database as they did on the source database, even though the primary key value of the referenced record on the source database is different from the new primary key value of the referenced record after it has been migrated to the destination database. As detailed above, such foreign key values can be updated in accordance with the information contained in the records of the migration table, which can specify the primary key values of the referenced record on the source database and the corresponding different primary key values of the records to be referenced on the destination database when the focus record is migrated to the destination database. Subsequent to the performance of step 755, at step 765, one or more migration tables can be can be updated with records reflecting the primary key value of the focus record on the source database and the new primary key value of the migrated focus record after it was migrated to the destination database. The processing of the flow diagram 700, or a current iteration of the flow diagram 700, as will be detailed below, can then end at step 770.

Returning back to the determinations of steps 715 and 720, as indicated previously, if the focus record has not already been transferred, as determined at step 715, but step 720 also determines that the records referenced by the focus record have, themselves, also not been transferred, then there may be either a side table situation, or a circular link situation. If the referenced records are not from a side table, nor are from a node that is linked to a currently processed node with a link that is marked as circular, then the current iteration of the processing of the steps of the flow diagram 700 can end at step 770. For example, and with reference to the exemplary table tree structure 161, shown in FIG. 2, if the focus record of step 710 is a record from a table corresponding to the node 270, then such a record can reference a record in a table corresponding to the node 271. However, because the node 271 is at a lower level in the table tree structure than the node 270, none of the records from the table corresponding to the node 271 can have been migrated at a time that the records of the table corresponding to the node 270 are first considered for migration. In such an instance, when the records of the table corresponding to the node 270 are first considered for migration, the determination, at step 725, will follow the "neither" path and processing will end at step 770.

Subsequently, when a record of the table corresponding to the node 271 is the focus record of step 710, the determination, at step 720, will find that the referenced record, from the table corresponding to the node 270, has not been transferred, for the reasons just described, but the determination, at step 725, will find that the link from the node 271 to the node 270 has been marked as circular 274. Accordingly, processing can proceed from step 725 to step 730 where the focus record can be read from the source table and merged into the destination table without the record referenced by such a focus record having already been migrated. Since such a referenced record has not already been migrated, there is no record in the migration table to specify the new identifier of the primary key of such a referenced record. Nevertheless, to "break the circle", the focus record is migrated over, except with the new foreign key value being a null value, or otherwise indicating that it has no valid value. Processing can then proceed to step 765, as detailed above, and the migration tables can be updated to include the new value of the primary key of the migrated focus record in the destination database.

The completion of the migration of circular records will be detailed further below with reference to additional steps from the exemplary flow diagram 600 of FIG. 6. Returning back to the determination, at step 725, another reason that referenced records, which are referenced by the focus record of step 710, have not already been transferred, as would be determined at step 720, can be that the referenced records are from a side table, which was not yet processed. For example, and with reference to the exemplary table tree structure 161 of FIG. 2, if the focus record of step 710 is a record in the table corresponding to the node 252, then its reference to a record of the table corresponding to the side node 260 will result in the determination 720 determining that such a referenced record has not already been transferred, because the side node has no level associated with it, and, consequently, the processing of the records of the table corresponding to the side node 260 has not yet been performed. Accordingly, in such an instance, after the determination, at step 725, that the referenced records are part of a side table, processing can proceed to step 735. Again, as detailed above, the description provided with reference to steps 735 through 750 illustrates a conceptually easier to understand record-by-record approach. In an implementation where all of the records of the focus table were selected in response to one or more programmatically generated queries, and merged in response to one or more programmatically generated merge commands, then the records of the focus table that reference side table records would not be selected and merged during such an iteration. Instead, the side tables would first be iteratively selected and merged, such as in the record-by-record manner of steps 735 through 750, and the records referencing such side tables would then be selected and merged during a subsequent iteration of the programmatically generated select and merge commands.

At step 735, which, as illustrated by the dashed lines, is optional, if there is no corresponding destination side table in the destination database, such a table can be created at step 735. As indicated previously, typically such tables would have been created prior to the migration performed according to the mechanisms described herein. Subsequently, at step 740, a record in the side table that is referenced by the focus record can be transferred to the destination database so that the focus record can be transferred to the destination database with the correct value in the foreign key referencing the primary key of the referenced record from the side table. However, in a situation where the side table itself references another side table, such as, for example, the table corresponding to the side node 260 having records that reference records from the table corresponding to the side node 262, an iterative process can be utilized to traverse up the side of nodes delineated by the table tree structure, such as the exemplary side nodes 260 and 262, shown in FIG. 2. As such, the transfer of a record from the table corresponding to the side node 260, for example, can entail the performance of the steps of the flow diagram 400, as illustrated by step 745, except that the record from the side table, corresponding to the side node 260, can be set, at step 740, as the selected table record, or "focus record" for purposes of the iterative repetition of the steps of the flow diagram 400 at step 745. As can be seen, such an iterative invocation of the steps of the flow diagram 400 will continue until a last side node, in a chain of one or more side nodes, is reached. At such a point, the performance of the steps of the flow diagram 700 will result in the determination, at step 720, that there are no further referenced records of any further side tables, and, as such, processing will proceed to steps 755 and 765, and the record from the side table will be migrated over and the migration tables appropriately updated. That iteration of the performance of the steps of the flow diagram 700 can then end, and processing can return to a prior iteration, at which point, again, at step 720, a determination can be made that the referenced records have now been transferred, and, again, steps 755 and 765 can be performed to migrate the current focus record and update the migration table accordingly. In such a manner, the iterative repetition of the steps of the flow diagram 700, by the step 745, can result in a traversal up along multiple side nodes in the table tree structure, and then back down transferring each record after any referenced side node records have already been transferred and the necessary information is already in the migration tables. Ultimately, such iterative processing can end and processing can then return to the steps of the flow diagram 600.

Turning back to the flow diagram 600 shown in FIG. 6, once the steps of the flow diagram 700 of FIG. 7 have been performed for the record selected at step 645, including the above described iterative performance to account for one or more layers of side tables, processing can return to the flow diagram 600 of FIG. 6, and proceed with step 650, at which point a determination can be made as to whether there are additional records in the table currently selected as the source table, such as from a prior performance of step 635. If, at step 650, it is determined that there are additional such records to be migrated, processing can return to step 645, and the next record can be selected, and then passed to the processing of the flow diagram 700 of FIG. 7, as shown. Conversely, if, at step 650, it is determined that there are no additional records in the table selected at step 635, then processing can proceed to step 655, at which point it can be determined whether there are additional nodes in the level selected by a prior performance of step 630, as described. If, at step 655, it is determined that there are additional such nodes, then processing can return to step 635, and the next node in the selected level can be selected, and the table corresponding to such a node can be set, at step 635, to be the new source table for another performance of the subsequent steps of the flow diagram 600. If, however, at step 655, it is determined that there are no additional nodes in the level selected by a prior performance of step 630, then processing can proceed to step 660, at which point it can be determined whether there are additional levels in the table tree structure that was received as part of the input of step 610. If, at step 660, it is determined that there are additional levels, then processing can return to step 630 for a next lower level to be selected, where the term "lower" is utilized to mean further from the root node then the currently selected level. Conversely, if, at step 660, it is determined that there are no additional levels, then a current iteration through the table tree structure can have been completed.

According to one aspect, the migration of data that references other data from one relational database to another accommodates changes in the identifiers assigned to the migrated data by migrating referenced data before migrating the referencing data. The construction of the table tree structure detailed above enables a subsequent migration component to proceed in and iterative a top-down manner, which should result in the referenced data being migrated before the referencing data such that the identifiers utilized by the referencing data can be updated in accordance with the new identifiers assigned to the referenced data when it was already migrated. According to such an aspect, the construction of a table tree structure does not accommodate the situation where records of one table reference records of another table but where that other table has no upward reference path to the root table. To accommodate such a situation, the mechanisms described herein utilize side tables, such as in the manner detailed.

The other aspect that requires particular consideration is that of circular links, as detailed, since such a circularity must be broken in order for one set of referenced data to be migrated so that updated identifiers can be available to utilize in migrating a subsequent set of referencing data. As previously detailed above with reference to step 540 of the flow diagram 500 of FIG. 5, one mechanism for breaking the circularity of links is to mark one of the links creating the circularity as a circular link. In such an instance, migration processing can utilize such a circular link marking to implement the migration of such circular linking data. More specifically, as also previously detailed above, this time with reference to step 730 of the flow diagram 700 of FIG. 7, if a link is encountered that is a circular link, the referencing data is migrated even though the referenced data has not already been migrated and, consequently, no new identifier is available. Instead, null values are inserted and processing proceeds as detailed above.

However, due to such circular links, and other reasons, a single iteration through the steps of the flow diagram 600 of FIG. 6 may not migrate all of the data. For example, some components of a multi-table circular link may have been skipped because the referenced data had never been migrated since the referencing data was not migrated. As indicated above, the insertion of null values can break the circularity, but then the subsequent iteration through the steps of the flow diagram 600 of FIG. 6 will be required to now migrate the rest of the data of the tables having circular links. According to one aspect, such iterative processing of the steps of the flow diagram 600 can continue until an iteration results in no additional records being migrated. At such a point a final iteration can be performed and, according to such an aspect, the performance of the final iteration can entail the removal of the null values previously inserted, and their replacement by the now known actual identifiers of the now already transferred referenced data. The steps 665, 670, 675, 680 and step 760 of the FIG. 7 illustrate one manner in which such a mechanism can be performed.

More specifically, once an iteration through the table tree structure has completed, as evidenced by the determination, at step 660, that there are no additional levels to iterate through, processing can proceed to step 665 where, if it is not a previously established final iteration, processing can proceed to step 670 and the selected level of the table can be reset the top of the table tree structure. Subsequently, at step 675, a determination can be made if there were any records migrated during the last direction. If, at step 675, is determined there were still records migrated during the last iteration, processing can return to step 630 and another iteration can be performed, such as detailed above. Conversely, if there were no records migrated during the last iteration, as determined at step 665, a final iteration can be set at step 680, such as by changing the value on a final iteration binary variable to now signify that an iteration to be performed is a final iteration. Processing can then return to step 630. In performing such a final iteration, while performing the steps of the flow diagram 700 of FIG. 7, all of the records being focused upon by the steps of the flow diagram 700 a FIG. 7, should already have been transferred. As such, for each record, the processing of the flow diagram 700 of FIG. 7 can comprise a determination, at step 715, that the record has already been transferred, leading to the performance of step 760. At step 760, nothing was performed during nonfinal iterations, but during a final iteration, previously established null values that were utilized when the focus record of a current iteration of the flow diagram 700 was previously migrated, can now be corrected to the proper values, based upon data that is already in the migration table. If any updates to the migration table is necessary, it can be performed at step 765, and the iteration of the flow diagram 700 can end at step 770. In such a manner, circular links can be accommodated utilizing the iterative data migration mechanisms described.

Figure 8:
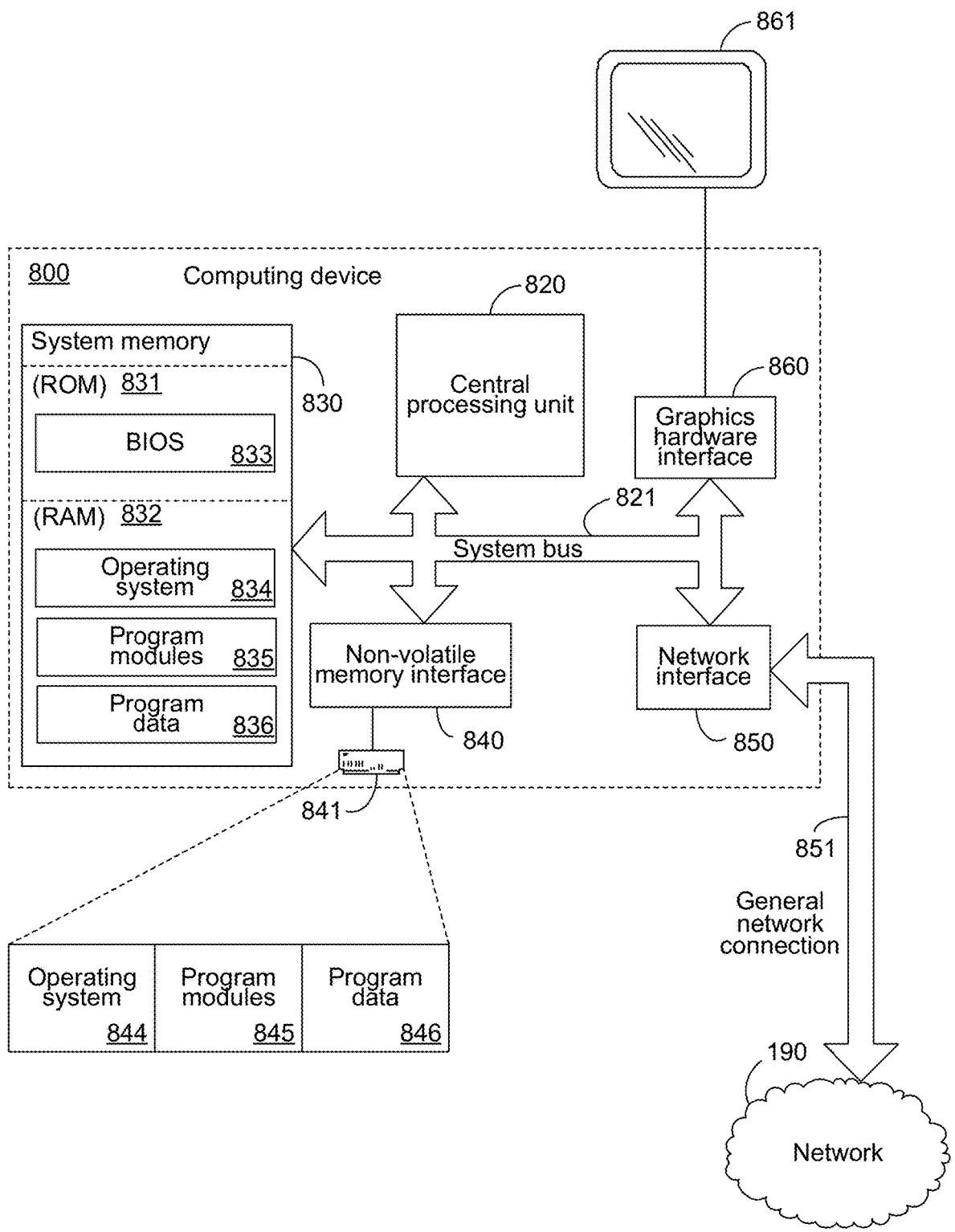
FIG. 8 is a block diagram of an exemplary computing device.

Turning to FIG. 8, an exemplary computing device 800 is illustrated which can perform some or all of the mechanisms and actions described above. The exemplary computing device 800 includes, but is not limited to, one or more central processing units (CPUs) 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. The computing device 800 can optionally include graphics hardware, including, but not limited to, a graphics hardware interface 860 and a display device 861, which includes display devices capable of receiving touch-based user input, such as a touch-sensitive, or multi-touch capable, display device. Depending on the specific physical implementation, one or more of the CPUs 820, the system memory 830 and other components of the computing device 800 can be physically co-located, such as on a single chip. In such a case, some or all of the system bus 821 can be nothing more than silicon pathways within a single chip structure and its illustration in FIG. 8 can be nothing more than notational convenience for the purpose of illustration.

The computing device 800 also typically includes computer readable media, which includes any available media that can be accessed by computing device 800 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 800. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer content between elements within computing device 800, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, other program modules 835, and program data 836.

The computing device 800 may also include other removable/non-removable, volatile/nonvolatile computer storage media. By way of example only, FIG. 8 illustrates a hard disk drive 841 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 841 is typically connected to the system bus 821 through a non-volatile memory interface such as interface 840.

The drives and their associated computer storage media discussed above and illustrated in FIG. 8, provide storage of computer readable instructions, data structures, program modules and other data for the computing device 800. In FIG. 8, for example, hard disk drive 841 is illustrated as storing operating system 844, other program modules 845, and program data 846. Note that these components can either be the same as or different from operating system 834, other program modules 835 and program data 836. Operating system 844, other program modules 845 and program data 846 are given different numbers hereto illustrate that, at a minimum, they are different copies.

The computing device 800 may operate in a networked environment using logical connections to one or more remote computers. The computing device 800 is illustrated as being connected to the general network connection 851 (to a network 190) through a network interface or adapter

850, which is, in turn, connected to the system bus 821. In a networked environment, program modules depicted relative to the computing device 800, or portions or peripherals thereof, may be stored in the memory of one or more other computing devices that are communicatively coupled to the computing device 800 through the general network connection 881. It will be appreciated that the network connections shown are exemplary and other means of establishing a communications link between computing devices may be used.

Although described as a single physical device, the exemplary computing device 800 can be a virtual computing device, in which case the functionality of the above-described physical components, such as the CPU 820, the system memory 830, the network interface 860, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 800 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example one or more computer-readable storage media comprising computer-executable instructions, which, when executed by one or more processing units, cause one or more computing devices, in aggregate, to: generate a table tree structure from a relational database schema of a source relational database, the table tree structure comprising: a first node corresponding to a first table in the source relational database, the first node being at a first level of the table tree structure, the first table comprising a first record having an identifier specified in a primary key column of the first table; a second node corresponding to a second table in the source relational database, the second node being at a second level of the table tree structure that is one level further from a root node than the first level, wherein a first record of the second table references the first record of the first table by specifying, in a foreign key column of the second table, the identifier of the first record of the first table that is specified in the primary key column of the first table; and a first link commencing at the second node and terminating at the first node; and migrate data from the source relational database to a destination relational database by iteratively traversing the table tree structure, the iterative traversal of the table tree structure comprising a first traversal of the table tree structure that comprises: reading a migration table to determine whether the first record of the second table has already been migrated, the migration table correlating old identifiers of records in the source relational database to new identifiers of corresponding migrated records in the destination relational database; reading the migration table to determine whether the first record of the first table has already been migrated; and migrating the first record of the second table from the source relational database to the destination relational database in response to determining, from the reading of the migration table, that the first record of the first table has been migrated but the first record of the second table has not been migrated.

A second example is the computer-readable storage media of the first example, wherein the first traversal of the table tree structure further comprises: inserting a first record into the migration table, the first record comprising an old identifier of the first record of the second table in the source relational database and a corresponding new identifier of a migrated copy of the first record of the second table in the destination relational database.

A third example is the computer-readable storage media of the first example, wherein a copy of the migration table exists in both the source relational database and in the destination relational database.

A fourth example is the computer-readable storage media of the first example, migrating the first record of the second table from the source relational database to the destination relational database comprises changing the identifier of the first record of the first table that is specified in the foreign key column of the second table to a corresponding new identifier obtained from the migration table.

A fifth example is the computer-readable storage media of the fourth example, wherein the determining that the first record of the first table has been migrated comprises finding a first record in the migration table corresponding to the first record of the first table, the first record in the migration table comprising: the identifier of the first record of the first table that is specified in the primary key column of the first table in the source relational database; and the corresponding new identifier, which is an identifier of the migrated first record in a corresponding first table in the destination relational database.

A sixth example is the computer-readable storage media of the first example, wherein the first traversal of the table tree structure further comprises: migrating records of tables corresponding to nodes at the first level of the table tree structure before migrating records of tables corresponding to nodes at the second level of the table tree structure.

A seventh example is the computer-readable storage media of the first example, wherein the table tree structure further comprises: a third node corresponding to a third table in the source relational database, the third node having no level assigned to it; and a second link commencing at the second node and terminating at the third node; wherein the first and second nodes are main nodes having links to higher levels of the table tree structure that, directly or indirectly, link to a root node; and wherein further the third node is a side node having no links to higher levels of the table tree structure that, directly or indirectly, link to the root node.

An eighth example is the computer-readable storage media of the seventh example, wherein the first traversal of the table tree structure further comprises: migrating records of the third table that are referenced by records of the second table prior to migrating the records of the second table.

A ninth example is the computer-readable storage media of the eighth example, wherein the first traversal of the table tree structure further comprises: migrating records of a fourth table that are referenced by the records of the third table that are referenced by the records of the second table prior to migrating the records of the third table that are referenced by records of the second table; wherein the table tree structure further comprises: a fourth node corresponding to the fourth table; a third link commencing at the third node and terminating at the fourth node; wherein the fourth node is also a side node no links to higher levels of the table tree structure that, directly or indirectly, link to the root node.

A tenth example is the computer-readable storage media of the first example, wherein the first traversal of the table tree structure further comprises: migrating the first record of the second table from the source relational database to the destination relational database in response to determining, from the reading of the migration table, that the first record of the first table has not been migrated and further determining that the first link is marked as a circular link in the table tree structure.

An eleventh example is the computer-readable storage media of the tenth example, wherein the migrating the first record of the second table if the first record of the first table has not been migrated comprises replacing the identifier of the first record, in the foreign key column of the second table, with a null value.

A twelfth example is the computer-readable storage media of the eleventh example, wherein the iterative traversal of the table tree structure further comprises a final traversal that comprises: replacing previously inserted null values with corresponding new identifiers of the migrated records in the destination relational database obtained from the migration table.

A thirteenth example is the computer-readable storage media of the first example, wherein the iterative traversal of the table tree structure comprises repeated traversals of the table tree structure while a quantity of records migrated during a prior traversal is greater than zero.

A fourteenth example is the computer-readable storage media of the thirteenth example, wherein the repeated traversals of the table tree structure end with a final traversal that is performed when a quantity of records migrated during a prior traversal is zero.

A fifteenth example is the computer-readable storage media of the first example, wherein the generating the table tree structure comprises: creating a first node record corresponding to the first node; identifying the second table by parsing the relational database schema to identify tables referencing the first table; creating a second node record corresponding to the second node; and creating a first link record corresponding to the first link.

A sixteenth example is the computer-readable storage media of the fifteenth example, wherein: the first node record comprises an identification of the first table and an indication that the first node is at the first level of the table tree structure; the second node record comprises an identification of the second table and an indication that the second node is at a second level in the table tree structure; the first link comprises an identification of the first table as the referenced table and an identification of the second table as the referencing table.

A seventeenth example is the computer-readable storage media of the fifteenth example, wherein the generating the table tree structure further comprises: identifying a third table by parsing the relational database schema to identify tables referenced by the second table that do not already have corresponding nodes in the table tree structure; and creating a third node record corresponding to a third node corresponding to the third table, the third node record comprising an indication that the third node is a side table node; wherein further the second node record comprises an indication that the second node is a main table node.

An eighteenth example is the computer-readable storage media of the fifteenth example, wherein the generating the table tree structure further comprises: identifying the first table a second time by parsing the relational database schema to identify tables referencing the second table; and updating the first link record to comprise an indication that the first link is a circular link.

A nineteenth example is one or more computer-readable storage media comprising computer-executable instructions, which, when executed by one or more processing units, cause one or more computing devices, in aggregate, to generate a table tree structure from a relational database schema of a source relational database, the table tree structure comprising: a first node corresponding to a first table in the source relational database, the first node being at a first level of the table tree structure, the first table comprising a first record having an identifier specified in a primary key column of the first table; a second node corresponding to a second table in the source relational database, the second node being at a second level of the table tree structure that is one level further from a root node than the first level, wherein a first record of the second table references the first record of the first table by specifying, in a foreign key column of the second table, the identifier of the first record of the first table that is specified in the primary key column of the first table; and a first link commencing at the second node and terminating at the first node; the generating the table tree structure comprising: creating a first node record corresponding to the first node; identifying the second table by parsing the relational database schema to identify tables referencing the first table; creating a second node record corresponding to the second node; and creating a first link record corresponding to the first link.

A twentieth example is one or more computer-readable storage media comprising computer-executable instructions, which, when executed by one or more processing units, cause one or more computing devices, in aggregate, to: migrate data from a source relational database to a destination relational database by iteratively traversing a table tree structure, the iterative traversal of the table tree structure comprising a first traversal of the table tree structure that comprises: reading a migration table to determine whether a first record of a second table has already been migrated, the migration table correlating old identifiers of records in the source relational database to new identifiers of corresponding migrated records in the destination relational database; reading the migration table to determine whether a first record of a first table has already been migrated; and migrating the first record of the second table from the source relational database to the destination relational database in response to determining, from the reading of the migration table, that the first record of the first table has been migrated but the first record of the second table has not been migrated; wherein the first record of the first table has an identifier specified in a primary key column of the first table; and wherein further the first record of the second table references the first record of the first table by specifying, in a foreign key column of the second table, the identifier of the first record of the first table that is specified in the primary key column of the first table.

As seen from the above descriptions, schema agnostic mechanisms for migrating delineated data between relational databases have been presented. In view of the many possible variations of the subject matter described herein, we claim as our invention all such embodiments as may come within the scope of the following claims and equivalents thereto.

We claim:

1. One or more computer-readable storage media comprising computer-executable instructions, which, when executed by one or more processing units, cause one or more computing devices, in aggregate, to:

migrate data from a source relational database to a destination relational database by iteratively traversing a table tree structure, the iterative traversal of the table tree structure comprising a first traversal of the table tree structure that comprises:

reading a migration table to determine whether a first record of a second table has already been migrated, the second table being at least one level farther from a root node of the table tree structure than a first table, the migration table correlating old identifiers of records in the source relational database to new identifiers of corresponding migrated records in the destination relational database;

reading the migration table to determine whether a first record of the first table has already been migrated; and migrating the first record of the second table from the source relational database to the destination relational database in response to determining, from the reading of the migration table, that the first record of the first table has been migrated but the first record of the second table has not been migrated, the migrating comprising changing the identifier of the first record of the first table that is specified in a foreign key column of the second table to a corresponding new identifier obtained from the migration table;

wherein the first record of the first table has an identifier specified in a primary key column of the first table; and wherein further the first record of the second table references the first record of the first table by specifying, in the foreign key column of the second table, the identifier of the first record of the first table that is specified in the primary key column of the first table.

2. The computer-readable storage media of claim 1, wherein the first traversal of the table tree structure further comprises:

inserting a first record into the migration table, the first record comprising an old identifier of the first record of the second table in the source relational database and a corresponding new identifier of a migrated copy of the first record of the second table in the destination relational database.

3. The computer-readable storage media of claim 1, wherein a copy of the migration table exists in both the source relational database and in the destination relational database.

4. The computer-readable storage media of claim 1, wherein the reading the migration table to determine whether the first record of the first table has already been migrated comprises finding a first record in the migration table corresponding to the first record of the first table, the first record in the migration table comprising:

the identifier of the first record of the first table that is specified in the primary key column of the first table in the source relational database; and the corresponding new identifier, which is an identifier of the migrated first record in a corresponding first table in the destination relational database.

5. The computer-readable storage media of claim 1, wherein the first traversal of the table tree structure further comprises:

migrating records of tables corresponding to nodes at a first level of the table tree structure before migrating records of tables corresponding to nodes at a second level of the table tree structure.

6. The computer-readable storage media of claim 1, wherein the first traversal of the table tree structure further comprises:

migrating records of a third table that are referenced by records of the second table prior to migrating the records of the second table;

wherein the table tree structure further comprises:

a third node corresponding to the third table in the source relational database, the third node having no level assigned to it; and a second link commencing at a second node and terminating at the third node;

wherein a first node and the second node are main nodes having links to higher levels of the table tree structure that, directly or indirectly, link to a root node; and wherein further the third node is a side node having no links to any other node of the tree structure having a higher level than the second node that, directly or indirectly, link to the root node.

7. The computer-readable storage media of claim 6, wherein the first traversal of the table tree structure further comprises:

migrating records of a fourth table that are referenced by the records of the third table that are referenced by the records of the second table prior to migrating the records of the third table that are referenced by records of the second table;

wherein the table tree structure further comprises:

a fourth node corresponding to the fourth table;

a third link commencing at the third node and terminating at the fourth node;

wherein the fourth node is also a side node having no links to any other node of the tree structure having a higher level than the second node that, directly or indirectly, link to the root node.

8. The computer-readable storage media of claim 1, wherein the first traversal of the table tree structure further comprises:

migrating the first record of the second table from the source relational database to the destination relational database in response to determining, from the reading of the migration table, that the first record of the first table has not been migrated and further determining that a first link relating to the first table and the second table is marked as a circular link in the table tree structure.

9. The computer-readable storage media of claim 8, wherein the migrating the first record of the second table if the first record of the first table has not been migrated comprises replacing the identifier of the first record, in the foreign key column of the second table, with a null value.

10. The computer-readable storage media of claim 9, wherein the iterative traversal of the table tree structure further comprises a final traversal that comprises:

replacing previously inserted null values with corresponding new identifiers of the migrated records in the destination relational database obtained from the migration table.

11. The computer-readable storage media of claim 1, wherein the iterative traversal of the table tree structure comprises repeated traversals of the table tree structure while a quantity of records migrated during a prior traversal is greater than zero.

12. The computer-readable storage media of claim 11, wherein the repeated traversals of the table tree structure end with a final traversal that is performed when a quantity of records migrated during a prior traversal is zero.

13. A method of migrating data from a source relational database to a destination relational database, the method comprising:
   iteratively traversing a table tree structure, the iterative traversal of the table tree structure comprising a first traversal of the table tree structure that comprises:
      reading a migration table to determine whether a first record of a second table has already been migrated, the second table being at least one level farther from a root node of the table tree structure than a first table, the migration table correlating old identifiers of records in the source relational database to new identifiers of corresponding migrated records in the destination relational database;
      reading the migration table to determine whether a first record of the first table has already been migrated; and
      migrating the first record of the second table from the source relational database to the destination relational database in response to determining, from the reading of the migration table, that the first record of the first table has been migrated but the first record of the second table has not been migrated, the migrating comprising changing the identifier of the first record of the first table that is specified in a foreign key column of the second table to a corresponding new identifier obtained from the migration table;
   wherein the first record of the first table has an identifier specified in a primary key column of the first table; and
   wherein further the first record of the second table references the first record of the first table by specifying, in the foreign key column of the second table, the identifier of the first record of the first table that is specified in the primary key column of the first table.

14. The method of claim 13, further comprising:
   migrating records of a third table that are referenced by records of the second table prior to migrating the records of the second table;
   wherein the table tree structure further comprises:
      a third node corresponding to the third table in the source relational database, the third node having no level assigned to it; and
      a second link commencing at the second node and terminating at the third node;
      wherein a first node and the second node are main nodes having links to higher levels of the table tree structure that, directly or indirectly, link to a root node; and
   wherein further the third node is a side node having no links to any other node of the tree structure having a higher level than the second node that, directly or indirectly, link to the root node.

15. The method of claim 14, wherein a first traversal of the table tree structure comprises:
   migrating records of a fourth table that are referenced by the records of the third table that are referenced by the records of the second table prior to migrating the records of the third table that are referenced by records of the second table;
   wherein the table tree structure further comprises:
      a fourth node corresponding to the fourth table;
      a third link commencing at the third node and terminating at the fourth node;
      wherein the fourth node is also a side node having no links to any other node of the tree structure having a higher level than the second node that, directly or indirectly, link to the root node.

16. The method of claim 13, wherein the first traversal of the table tree structure comprises:
   migrating the first record of the second table from the source relational database to the destination relational database in response to determining, from the reading of the migration table, that the first record of the first table has not been migrated and further determining that a first link relating to the first table and the second table is marked as a circular link in the table tree structure.

17. The method of claim 16, wherein the migrating the first record of the second table if the first record of the first table has not been migrated comprises replacing the identifier of the first record, in the foreign key column of the second table, with a null value.

18. The method of claim 17, wherein the iterative traversal of the table tree structure further comprises a final traversal that comprises:
   replacing previously inserted null values with corresponding new identifiers of the migrated records in the destination relational database obtained from the migration table.

19. A system, comprising:
   a processor; and
   a memory device that stores computer-executable instructions, which, when executed by the processor, cause a computing device to:
   migrate data from a source relational database to a destination relational database by iteratively traversing a table tree structure, the iterative traversal of the table tree structure comprising a first traversal of the table tree structure that comprises:
      reading a migration table to determine whether a first record of a second table has already been migrated, the second table being at least one level farther from a root node of the table tree structure than a first table, the migration table correlating old identifiers of records in the source relational database to new identifiers of corresponding migrated records in the destination relational database;
      reading the migration table to determine whether a first record of the first table has already been migrated; and
      migrating the first record of the second table from the source relational database to the destination relational database in response to determining, from the reading of the migration table, that the first record of the first table has been migrated but the first record of the second table has not been migrated, the migrating comprising changing the identifier of the first record of the first table that is specified in a foreign key column of the second table to a corresponding new identifier obtained from the migration table;
   wherein the first record of the first table has an identifier specified in a primary key column of the first table; and wherein further the first record of the second table references the first record of the first table by specifying, in the foreign key column of the second table, the identifier of the first record of the first table that is specified in the primary key column of the first table.

20. The system of claim 19, wherein the reading the migration table to determine whether the first record of the first table has already been migrated comprises finding a first record in the migration table corresponding to the first record of the first table, the first record in the migration table comprising:

the identifier of the first record of the first table that is specified in the primary key column of the first table in the source relational database; and the corresponding new identifier, which is an identifier of the migrated first record in a corresponding first table in the destination relational database.

* * * * *